(12) United States Patent
Chevalier et al.

(10) Patent No.: US 12,332,346 B2
(45) Date of Patent: Jun. 17, 2025

(54) SITUATIONAL AWARENESS SYSTEM FOR AN AUTONOMOUS OR SEMI-AUTONOMOUS VEHICLE

(71) Applicants: BeHaulT Industrial Property Office B.V., Genk (BE); Autonomous Knight BV, Genk (BE)

(72) Inventors: Philippe Arthur Jean Ghislain Chevalier, Deinze (BE); Geoffrey Ejzenberg, Lier (BE); Noël Jans, Val-Meer (BE)

(73) Assignees: BeHaulT Industrial Property Office B.V., Genk (BE); Autonomous Knight BV, Genk (BE)

( * ) Notice: Subject to any disclaimer, the term of this patent is extended or adjusted under 35 U.S.C. 154(b) by 251 days.

(21) Appl. No.: 17/784,400

(22) PCT Filed: Dec. 7, 2020

(86) PCT No.: PCT/EP2020/084949
§ 371 (c)(1),
(2) Date: Jun. 10, 2022

(87) PCT Pub. No.: WO2021/116045
PCT Pub. Date: Jun. 17, 2021

(65) Prior Publication Data
US 2023/0020142 A1    Jan. 19, 2023

(30) Foreign Application Priority Data
Dec. 12, 2019   (WO) ................ PCT/EP2019/084986

(51) Int. Cl.
*G01S 13/931* (2020.01)
*G01S 13/89* (2006.01)
*G05D 1/00* (2024.01)

(52) U.S. Cl.
CPC ............ *G01S 13/931* (2013.01); *G01S 13/89* (2013.01); *G05D 1/0088* (2013.01); *G01S 2013/93271* (2020.01); *G01S 2013/93272* (2020.01)

(58) Field of Classification Search
CPC .................. G01S 13/931; G01S 13/89; G01S 2013/93271; G01S 2013/93272; G05D 1/0088
See application file for complete search history.

(56) References Cited

U.S. PATENT DOCUMENTS 6,421,593 B1   7/2002   Kempen et al.
7,604,300 B2   10/2009  Whitfield, Jr. et al.
(Continued)

FOREIGN PATENT DOCUMENTS

CN   111587407 B  *  1/2024  .......... B60W 50/023
EP   1359032 A2      11/2003
(Continued)

OTHER PUBLICATIONS

Sahin, Furkan E., "Long-Range, High-Resolution Camera Optical Design for Assisted and Autonomous Driving," Photonics, vol. 6. No. 73, pp. 1-13; MDPI Jun. 2019.
(Continued)

*Primary Examiner* — Ladimir Magloire
*Assistant Examiner* — Maxine McKenzie Phillips
(74) *Attorney, Agent, or Firm* — Hoffmann & Baron, LLP

(57) ABSTRACT

A situational awareness system for a vehicle comprising a cyber-physical system, wherein the situational awareness system is configured to generate an imaging dataset for processing by the cyber-physical system for enabling semi-autonomous or autonomous operational mode of the vehicle, wherein the situational awareness system includes a sensory system with a first electro-optical unit for imaging the
(Continued)

surroundings of the vehicle, a second electro-optical unit configured for imaging a ground area in a direct vicinity of the vehicle, a radar unit for detecting objects, and a third electro-optical unit for object identification, wherein the situational awareness system further includes a data synchronization system configured to synchronize the imaging dataset obtained by means of each unit of the sensory system, wherein the data synchronization system is configured to provide the synchronized imaging dataset to the cyber-physical system of the vehicle.

30 Claims, 15 Drawing Sheets

(56) References Cited

U.S. PATENT DOCUMENTS

| | | | |
|---|---|---|---|
| 9,102,220 B2* | 8/2015 | Breed | B60R 21/0132 |
| 9,663,033 B2 | 5/2017 | Bharwani | |
| 10,928,830 B1* | 2/2021 | Tran | B60W 30/12 |
| 2004/0036245 A1 | 2/2004 | Mollhagen | |
| 2004/0051659 A1 | 3/2004 | Garrison | |
| 2006/0291849 A1 | 12/2006 | Shamir et al. | |
| 2011/0200319 A1* | 8/2011 | Kravitz | G03B 19/07 |
| | | | 348/262 |
| 2012/0143430 A1* | 6/2012 | Broggi | G01S 17/931 |
| | | | 348/148 |
| 2015/0077281 A1 | 3/2015 | Taniguchi et al. | |
| 2016/0146941 A1 | 5/2016 | Hassenpflug et al. | |
| 2017/0120823 A1 | 5/2017 | Mitsuta et al. | |
| 2019/0329729 A1* | 10/2019 | Hilligardt | B60R 21/34 |
| 2020/0269782 A1 | 8/2020 | Fujihira et al. | |

FOREIGN PATENT DOCUMENTS

| | | |
|---|---|---|
| EP | 3396407 A1 | 10/2018 |
| EP | 3496067 A1 | 6/2019 |
| JP | 2001021610 A * | 1/2001 |

OTHER PUBLICATIONS

Williams Jr., et al., "Optimization of Eyesafe Avalanche Photodiode Lidar for Automobile Safety and Autonomous Navigation Systems," Optical Engineering, vol. 56, No. 3, pp. 031224-1-031224-9, Mar. 2017.

Davis, James W., et al., "Background-Subtraction Using Contour-Based Fusion of Thermal and Visible Imagery," Computer Vision and Image Understanding, vol. 106, pp. 162-182, Jan. 2007.

Torresen, Jim, et al., "Efficient Recognition of Speed Limit Signs, " Proceedings of the 7th International IEEE Conference on Intelligent Transportation Systems, pp. 652-656, IEEE, Oct. 2004.

Belcarz, K., et al. "Developing Autonomous Vehicle Research Platform—A Case Study," IOP Conference Series: Materials Science and Engineering, vol. 421, pp. 1-9, IOP Publishing (2018).

Hecht, Jeff, "Lidar for Self-Driving Cars", Optics & Photonics News, pp. 26-33, Jan. 2018.

Choi, Nakeun, et al., "Illuminant-Invariant Stereo Matching Using Cost Volume and Confidence-Based Disparity Refinement", Journal of the Optical Society of America, vol. 36, No. 10, Oct. 2019.

Office Action issued in Chilean Application No. 202201560 on Nov. 7, 2023.

English-language Summary of Office Action issued in Chilean Application No. 202201560 on Nov. 7, 2023.

English-language summary of Office Action issued in Chilean Application No. 202201560 on May 7, 2024.

* cited by examiner

SITUATIONAL AWARENESS SYSTEM FOR AN AUTONOMOUS OR SEMI-AUTONOMOUS VEHICLE

CROSS-REFERENCE TO RELATED APPLICATIONS

This application is a U.S. National Phase application of International Application No. PCT/EP2020/084949, filed Dec. 7, 2020, which claims priority to application number PCT/EP2019/084986, filed Dec. 12, 2019, the disclosures of which are incorporated herein by reference in their entirety.

TECHNICAL FIELD

The present invention relates to a situational awareness system for a vehicle capable of autonomous or semi-autonomous moving. Further, the invention relates to a vehicle comprising a situational awareness system. The invention also relates to a method of arranging a network of situational awareness sensors for a vehicle capable of autonomous or semi-autonomous moving. Additionally, the invention relates to a method for improving the key performance indicators of a vehicle using a situational awareness system. Furthermore, the invention relates to a use of a situational awareness system.

BACKGROUND ART

Vehicles may include a situational awareness system for enabling autonomous and/or semi-autonomous movement. A situational awareness system is a network of sensors consisting mainly of electro-optical units generating a dataset that consists primarily of images taken of the surroundings of the vehicle. Such systems are well-known in the art and may result in capturing images of the surroundings of the vehicle in different spectral bands. Those multi-spectral images may be combined by a process known as data fusion. The data fusion results in a superhuman perception of the surroundings of the vehicle.

Below, some terminology that is used in this text is described.

The term cyber-physical system (CPS), as given in the National Science Foundation document NSF19553, refers to engineered systems that are built from, depend upon, the seamless integration of computation and physical components. CPS tightly integrate computing devices, actuation and control, networking infrastructure, and sensing of the physical world. The system may include human interaction with or without human aided control. CPS may also include multiple integrated system components operating at wide varieties of spatial and temporal time scales. They can be characterized by architectures that may include distributed or centralized computing, multi-level hierarchical control and coordination of physical and organizational processes. CPS is a holistic approach to the design of machines.

Advances in CPS should enable capability, adaptability, scalability, resilience, safety, security, and usability far beyond what is available in the simple embedded systems of today. CPS technology will transform the way people interact with engineered systems—just as the Internet has transformed the way people interact with information. CPS are driving innovation and competition in a range of sectors, including agriculture, aeronautics, building design, civil infrastructure, energy, environmental quality, healthcare and personalized medicine, manufacturing, and transportation.

The advent of Internet-of-Things (IoT) allows CPS components to communicate with other devices through cloud-based infrastructure, and to interact with (potentially) safety-critical systems, posing new research challenges in safety, security, and dependability. A guidebook for the cybersecurity for cyber-physical vehicle systems is issued by SAE International [SAE J3016-JAN2016].

The term hybrid electric refers to a vehicle that combines a conventional internal-combustion engine (ICE) or another engine with an electric propulsion system. The presence of the electric powertrain is intended to achieve either better fuel economy than a conventional vehicle or better performance.

There is a clear difference between the terminology used in the standard ISO 17757:2019 and the standard SAE J3016, that describes the six level-specific driving automation modes (level 0 to level 5). The SAE J3016 is mainly applicable for normal vehicles while ISO 17757:2019 is mainly applicable for off-highway machines and particularly for mining dump trucks.

The term ASAM, according to ISO 17757:2019, refers to both semi-autonomous machines operating in autonomous mode and autonomous machines.

The term autonomous mode, according to ISO 17757:2019, is defined as mode of operation in which a mobile machine performs all machine safety-critical and earth-moving or mining functions related to its defined operations without operator interaction. The operator could provide destination or navigation input but is not needed to assert control during the defined operation.

The term autonomous machine, according to ISO 17757:2019, refers to a mobile machine that is intended to operate in autonomous mode during its normal operating cycle.

The term semi-autonomous machine, according to ISO 17757:2019, refers to a mobile machine that is intended to operate in autonomous mode during part of its operating cycle and which requires active control by an operator to complete some of the tasks assigned to the machine.

It is a goal to provide for improved situational awareness systems for vehicles. The vehicle may for instance be a dump truck for surface mining. Various models and types exist. Often, heavy-duty mining dump trucks are used in surface mining for hauling activities. These hauling activities comprise the movement of overburden and ore from a certain point in the mine to another point over well-defined routes. To optimize the hauling activities, it is considered by the mining industry to upgrade the existing dump trucks by installing add-on equipment allowing the existing trucks to become driverless. This strategy used in the surface mining industry is reviewed and an alternative that is the subject of this invention is described.

The standard heavy-duty mining dump trucks are found in the publications of Caterpillar, Hitachi, Komatsu, Liebherr and BelAz. An example of such a standard heavy-duty mining dump truck is given in Publication 1. A standard heavy-duty mining dump truck used in surface mines has generally a single unit frame equipped with two axles and six tires. The front axle is equipped with two steering, but non-driving wheels and the rear axle is equipped with four non-steering driving wheels as shown in Publication 2. Above the frame, in the front part, a cabin is mounted for the driver and in the rear part an open-end dump body is mounted. Standard dump trucks are using side mirrors to give the driver a view about the periphery of the dump truck.

Inventions related to systems and methods for collision avoidance, as in Publication 3, use a scored-based collision region of interest. Many of these systems and methods rely on information transferred through wireless communication from a dispatching station to the mining dump truck or between the mining dump trucks themselves. Collisions between mining dump trucks with add-on sensor packs, that communicate their positions, speed and direction of travel using a wireless communication system, have occurred.

In some cases, work site data transmitted to the mining dump truck could be corrupt or erroneous, resulting in the wrong decisions by the mining dump truck.

Publication 4 and Publication 5 disclose a peripheral recognition device and an obstacle discrimination device for an off-road dump truck or mining work machine. The recognition device is based on the emission of an electromagnetic wave from a millimeter wave radar, a laser radar or a lidar (light detection and ranging) (Hecht2018). These active sensing devices have limited angular resolutions (Williams2017) compared to imaging sensors operating in the visible and near-infrared, short-wave infrared and/or long-wave infrared. Essential for a peripheral recognition device is its performance in detection (D), recognition (R) and identification (I) of objects (Chevalier2016) and identify them as obstacles or non-obstacles. Calculation can show that millimeter wave radars and laser radars have not the required instantaneous field of view to perform the DRI operation based on the criteria of DRI of a standardized person with dimensions 1.75 m×0.6 m at a degraded meteorological visibility of 2 km.

It is also known that millimeter radars and laser radars do not perform well in dynamic situations in which rapid ranging and imaging of an entire scene are required (Williams2017).

Publication 7 describes a periphery monitoring apparatus that displays to the driver a camera image of the surroundings of the large dump truck on a display apparatus. An operator switch allows the driver to select one of the camera images. These camera solutions, as disclosed in Publication 7 are useful when the dump truck is moving slowly, as in the case of parking.

Depth perception can also be obtained by using stereo-matching techniques. In these techniques, the illumination change is a major problem that degrades the matching accuracy as discussed in the article of Choi et al. [Choi2019]. A situational awareness system should always (day and night) be able to be effective. However, a single sensor is generally not effective in all situations as discussed by Davis and Sharma [Davis2007].

Publication 8 describes a plurality of sensors gathering information about a region around the periphery of a motor vehicle. The sensor system is equipped with a radar assembly, an infrared detection assembly, and a visible light detection assembly. A central processing unit integrates data gathered from the three assemblies and combines them to form an aggregate data set of the individual region. The CPU also combines aggregate data sets from all the sensors and displays the information on a dashboard mounted display. The Publication 8 claims the invention of a near object sensor for a heavy vehicle comprising at least two of: a radar assembly, an infrared detection assembly and a visible light detection assembly. The Publication 8 is not explaining how to design or construct such a situational awareness system. It refers to conventional designs where arrays of sensors are created. The creation of the arrays and their interconnection is crucial to the success of the situational awareness system. The present invention discloses the details of a situational awareness system for autonomous or semi-autonomous vehicles.

The standards and publications mentioned above are merely provided for illustrative purposes and the invention is not limited in any way to their teachings.

PRIOR ART PATENT PUBLICATIONS

Publication 1: U.S. Pat. No. 7,604,300 (LIEBHERR MINING EQUIP) 20 Oct. 2009;
Publication 2: EP 1359032 A2 (LIEBHERR WERK BIBERACH) 5 Nov. 2003;
Publication 3: U.S. Pat. No. 9,663,033 (CATERPILLAR) 30 May 2017;
Publication 4: EP 3396407 A1 (HITACHI CONSTRUCTION MACHINERY) 31 Oct. 2018;
Publication 5: EP 3496067 A1 (HITACHI CONSTRUCTION MACHINERY) 12 Jun. 2019;
Publication 7: US 20170120823 A1 (KOMATSU LIMITED) 4 May 2017;
Publication 8: US 20040051659 A1 (BENDIX COMMERCIAL VEHICLE SYSTEMS) 18 Sep. 2002;

Monograph Documents

Groves, Paul D., Principles of GNSS, INERTIAL, AND MULTISENSOR INTEGRATED NAVIGATION SYSTEMS, Artech House, ISBN-13:978-1-58053-255-6, 2008.

Article Documents

NSF19553, Cyber-Physical Systems (CPS), National Science Foundation, Feb. 13, 2019.
Williams Jr., George M., "Optimization of eyesafe avalanche photodiode lidar for automobile safety and autonomous navigation systems", Optical Engineering 56(3), 031224 (March 2017).
Chevalier, Philippe A. J. G., On the specification of the DRI requirements for a standard NATO target, DOI: 10.13140/RG.2.1.4833.9604, (March 2016). Nakeun Choi, Jinbuem Jang and Joonki Paik, "Illuminant-invariant stereo matching using cost volume and confidence-based disparity refinement", JOSAA Vol. 39, No. 10, October 2019, DOI:10.1364/JOSAA.36.001768.
James W. Davis and Vinay Sharma, "Background-subtraction using contour-based fusion of thermal and visible imagery", Computer Vision and Image Understanding 106(2007), pp 162-182, DOI: 10.1016/j.cviu.2006.06.010.
Hecht Jeff, "Lidar for Self-Driving Cars", Optics & Photonics News, January 2018, pp 26-33.
Jim Torresen and Jorgen W. Bakke and Lukas Sekanina, "Efficient recognition of speed limit signs", The 7th International IEEE Conference on Intelligent Transportation Systems (IEEE Cat. No. 04TH8749), October 2004, pp 652-656, DOI: 10.1109/ITSC.2004.1398978.
Furkan E. Sahin, "Long-Range, High-Resolution Camera Optical Design for Assisted and Autonomous Driving", *Photonics* 2019, 6, 73, DOI:10.3390/photonics6020073.
K. Belcarz et al., "Developing autonomous vehicle research platform a case study", IOP Conf. Ser.: Mater. Sci. Eng. 421(2018) 022002, DOI:10.1088/1757-899X/421/2/022002

Standard Documents

ISO 17757:2019, Earth-moving machinery and mining—Autonomous and semi-autonomous machine system safety, Second edition 2019-07.

IEC 60825-1:2014, Safety of laser products—Part 1: Equipment classification and requirements, Edition 3.0, 2014-05-15.

SAE J3061-JAN2016, Cybersecurity Guidebook for Cyber-Physical Vehicle Systems, SAE International, Issued 2016-01.

Problem to be Solved by the Invention

The problem to be solved can be the improvement of the key performance indicators (KPI) of vehicles. Various types of vehicles can be used.

For example, the vehicle may be a dump truck. The invention may improve values of the key performance indicators of mining haulage, for example open surface mine haulage. Many mining companies consider the key performance indicator for a haulage vehicle as the overall yearly cost per metric ton. In doing so, lumped characteristics are considered showing a black-box approach like the rimpull curve of a mining dump truck. However, the metric based on yearly throughput per haulage route expressed in cost per metric ton is not the correct metric for comparing mining dump trucks in a future investment scenario to decarbonize the surface mining industry. This selection process, using our mathematical model of the dump truck, can be performed by comparing classical dump trucks with hybrid electric mining dump trucks or even full-electric mining dump trucks. Our mathematical model of the dump truck allows to design the most appropriate mining dump truck for the given route in the mine. As the mine layout changes over time, one should be able to change the mining dump truck configuration to keep the highest values in the key performance indicators. The mathematical model of the dump truck is at the core of the cyber-physical system and is used by the cyber-physical system to control the mining dump truck in its physical space and cyberspace. The mathematical model of the dump truck shows that the availability of a dump truck has a large effect on the throughput of the overall mine. The availability of the dump truck is influenced by the perception of the cyber-physical system of the vehicle's surroundings.

In a surface mine many different sized objects are moving and non-moving. Each of these objects are emitting passively a thermal infrared wave and at times of the day these objects reflect specular and/or diffuse light from natural and man-made light sources.

From the perspective of an autonomous or semi-autonomous vehicle a complex dynamic scenery exists. The weakest link, from safety point of view, in the scenery are the people moving or standing in the surroundings of the vehicle. A standardized person has a cross-sectional area of 1.75 m×0.6 m and should be identified by an autonomous or semi-autonomous vehicle such that the cyber-physical system of the vehicle can take the proper actions not to hurt or endanger the person. At surface mines harsh environmental conditions exists that constrain the set of potential solutions to the given problem.

On the other hand, in a surface mine the goal is to obtain a maximum throughput of ore in the haulage process and thus an autonomous or semi-autonomous vehicle should drive at maximum speed whenever possible. So, any identification system of persons should be capable of detect (D), recognize (R, and identify (I) persons at any time of the day under any environmental condition and when the vehicle is moving at a maximum speed which is typically in the order of 50 km/h.

The present invention, therefore, has as an object to disclose a situational awareness system and a method of design of a situational awareness system for improving the key performance indicators of a moving machine.

SUMMARY OF THE INVENTION

It is an object of the invention to provide for a method and a system that obviates at least one of the above-mentioned drawbacks.

Additionally or alternatively, it is an object of the invention to improve the operation of the vehicle.

Additionally or alternatively, it is an object of the invention to improve the availability of the dump truck to the mining companies.

Additionally or alternatively, it is an object of the invention to improve the safety of operation of the vehicle.

Additionally or alternatively, it is an object of the invention to improve the reliability of the vehicle.

Additionally or alternatively, it is an object of the invention to improve the key performance indicators of the vehicle.

Additionally or alternatively, it is an object of the invention to decrease the latency of the situational awareness system employed in a vehicle. Thereto, the invention provides for a situational awareness system for a vehicle, wherein the situational awareness system is configured to generate an imaging dataset for processing by the cyber-physical system for enabling semi-autonomous or autonomous operational mode of the vehicle, wherein the situational awareness system includes a sensory system comprising: a first electro-optical unit configured for imaging the surroundings of the vehicle; a second electro-optical unit configured for imaging a ground area in a direct vicinity of the vehicle; a radar unit including at least a first radar unit pointing in a frontward direction of the vehicle and a second radar unit pointing in a rearward direction of the vehicle, the first and second radar units being configured to detect objects; and a third electro-optical unit configured for object detection in an area at least partially surrounding the vehicle, the third electro-optical unit including a first subunit configured for operating in at least one of a visible or a near-infrared wavelength band, a second subunit configured for operating in a thermal infrared wavelength band, and an optical splitter configured for separating wavelength bands to spectrally sensitive imaging sensors of the first and second subunits, and wherein the first and second subunits are arranged for co-axial imaging of a scene with an equal instantaneous field of view and matching distortion, wherein the third electro-optical unit includes at least one optical stabilization arrangement, and wherein the third electro-optical unit further includes a further range finder configured for optically ranging detected objects in the scene; and wherein the situational awareness system further includes a data synchronization system configured to synchronize the imaging dataset obtained by means of each unit of the sensory system, wherein the data synchronization system is configured to provide the synchronized imaging dataset to the cyber-physical system of the vehicle. Advantageously, the latency of the situational awareness system of the vehicle can be effectively reduced in an advantageous manner, eliminating the need for certain image processing operations and homographic transformations.

It will be appreciated that the invention can be employed in various type of vehicles. In some of the shown embodiments, a wheeled truck is illustrated. However, the vehicle may also be for example an unmanned aerial vehicle (UAV).

Advantageously, by employing the method and system according to the invention, the UAV can initiate a safe landing or even continue operation if one of the electro-optical sensors fails, thereby reducing the risk of a crash. Similarly, the invention may also be employed for naval vehicles for example an unmanned surface vehicle (USV). The vehicle may also be a railway vehicle consisting of a series of connected vehicles for example a train. In some examples, the vehicle is an off-highway dump truck which is arranged for surface mining, the dump truck including a cyber-physical system, wherein the situational awareness system is configured to generate an imaging dataset for processing by the cyber-physical system for enabling semi-autonomous or autonomous operational mode of the dump truck, wherein the situational awareness system includes a sensory system comprising: a first electro-optical unit configured for imaging the surroundings of the dump truck; a lower deck unit configured for imaging a bottom part of the dump truck; a second electro-optical unit configured for imaging a ground area in a direct vicinity of the dump truck; a dump body inspection unit configured for imaging content in a dump body of the dump truck; a radar unit including at least a first radar unit pointing in a frontward direction of the dump truck and a second radar unit pointing in a rearward direction of the dump truck, the first and second radar units being configured to detect objects; and a third electro-optical unit configured for object detection in an area at least partially surrounding the dump truck, the third electro-optical unit including a first subunit configured for operating in at least one of a visible or a near-infrared wavelength band, a second subunit configured for operating in a thermal infrared wavelength band, and an optical splitter configured for separating wavelength bands to spectrally sensitive imaging sensors of the first and second subunits, and wherein the first and second subunits are arranged for co-axial imaging of a scene with an equal instantaneous field of view, wherein the third electro-optical unit includes at least one optical stabilization arrangement, and wherein the third electro-optical unit further includes a second/further range finder configured for optically ranging detected objects in the scene; and wherein the situational awareness system further includes a data synchronization system configured to synchronize the imaging dataset obtained by means of each unit of the sensory system, wherein the data synchronization system is configured to provide the synchronized imaging dataset to the cyber-physical system of the dump truck.

The situational awareness system can be configured to generate a data set which is to be provided to the cyber-physical system of the truck. The cyber-physical system can be configured to process the data. The situational awareness system may include means for stitching images (e.g. building a panorama image by accordingly stitching a plurality of images together, for example having a partial overlap of data of e.g. 20 percent).

The situational awareness system may include different hardware sensors for imaging. The different hardware sensors may capture different spectral images. An alignment and/or stabilization can be performed (e.g. co-axial, instantaneous field of view (IFOV) adjustment, gyro stabilization both in azimuth and elevation, etc.). The situational awareness system may include means for determining a horizon, in order to enabling stitching together the images for providing a panoramic view. The situational awareness system may be configured to determine a line of sight (LOS) of imaging units. Different images may be combined in one sensor. For example, three wavelength regions can come together in the electro-optical unit (with three subunits). Each subunit can be configured to generate one image. The three images can be fused and forwarded to the cyber-physical system for further processing.

Different sensors, for example arranged in a sensor pack, can be assembled. Aligning of different channels with each other for providing a co-axial imaging can be performed in different ways. The situational awareness system according to the invention can be configured to handle cooperation of all the imaging sensors (e.g. multi-spectral imaging unit). The combination of the imaging sensors can generate a data set (multi-dimensional), which is to be processed by the cyber-physical system. To obtain a reliable situational awareness, different data, e.g. azimuth, elevation, range and time can be transmitted synchronously in a data set. The data from different imaging sensors can be synchronized. The mapping can be performed every 20 ms for example. All retrieved data may be time stamped. The data can be aligned in space and time (4D matrix, with data from the different sensors). For example, one voxel may include different data (e.g. representing short wave imaging data, long wave imaging data, visual near-infrared wave imaging data). Other data, such as for example distance, azimuth, elevation, and time can be added to the data.

The fused image can give a much better distinction between the observed objects (cf. multi-spectral). If there is too much dust for example, a CMOS signal-to-ratio can drop significantly, but the thermal camera (long-wave or even short-wave) may provide the ability to at least partially see through the dust.

The situational awareness system can be configured to generate a dataset and assign weights to the obtained images from the different units and/or subunits. The weights can be adjusted dynamically (for example considering weather data).

In some examples, the situational awareness system includes a central clock. Some examples provide for a time stamp to the captured data, wherein the time stamp associated with the imaging data are provided to synchronize all imaging data with respect to each other. In some examples, all imaging data is synchronized prior to forwarding it to the cyber-physical system.

The optical axis for different spectra can be aligned. For example, the third electro-optical unit (e.g. long range electro-optical unit) may include three subunits, and each of the subunits working in different wavelength ranges and configured for coaxial observation of the scene. For example, a mix of long wave, short range and visible/near infrared can be observed, wherein a first beam splitter is configured to split the longest wavelength, and then short wave, and finally the visible/near infrared. This can be also done in a different order.

The image fusion can be performed with a same instantaneous field of view IFOV. A multi-spectral co-axial instantaneous field of view provides important advantages. For instance, the parallax problem does not exist when working with a co-axial device. The calibration of the cameras can be much easier. It can become easier to fuse the images properly and without errors.

The first electro-optical unit may be a short-range electro-optical unit mainly to be used for parking, positioning of the truck relative to a loader, etc. It can provide an indication of objects in proximity to the truck.

The third electro-optical unit may have more subunits. For example, visible and near-infrared may be separated in the third electro-optical unit resulting in more optical channels. By providing co-axial channels with instantaneous field of view more accurate results can be received. The spectral images obtained through the co-axial observation can be split using a beam splitter unit comprising of two or more beam splitters. For example, the beam splitter may be configured to separate the incoming beam into three beams covering different wavelength bands. The three beams can for instance be guided respectively to the visible/near infrared sensor (detection/wavelength subunits), to the shortwave infrared sensor, and to the longwave infrared sensor.

Optionally, the third electro-optical unit includes at least two long-range electro-optical subunits pointing in front directions, and configured such that the captured scenes are overlapping, and includes at least two long-range electro-optical subunits pointing in rear directions, and configured such that the captured scenes are overlapping, wherein the overlapping scenes allow the retrieval of 3D information of the scenery.

Optionally, the third electro-optical unit images at least four spectral bands covered by four different subunits.

Optionally, the thermal infrared subunit is operating in the wavelength range of 7 µm to 14 µm.

Optionally, the thermal infrared subunit is operating in the wavelength range of 3 µm to 5 µm.

Optionally, the thermal infrared subunit is using an uncooled microbolometer.

Optionally, the thermal infrared subunit is using a cooled (T~70-85 K) sensor.

Optionally, the laser range finder preferred embodiment operates in the wavelength range of 1.3 µm to 1.7 µm.

Optionally, the laser range finder preferred embodiment operates in the wavelength range of 0.78 µm to 0.98 µm.

Optionally, the laser range finder is equipped with an azimuth and elevation coarse and fine pointing mechanism to select an object or multiple objects from the scenery.

Optionally, depth perception is obtained using only the long-wave infrared subunit.

Optionally, the vehicle is capable of autonomous or semi-autonomous moving, wherein the situational awareness system of the vehicle comprises a network with a plurality of units distributed therein, wherein the plurality of units includes sensors and actuators and embedded computational units, wherein the plurality of units is distributed in the network in a fault tolerant network topology.

Optionally, the fault tolerant network topology is a wheel topology formed by vertices which are interconnected by means of edges.

Optionally, the central vertex of the wheel network includes a central computing unit including at least three embedded systems. Each of the three embedded systems may be connected to the other embedded systems of the central computing unit. Instead of using a single embedded system in the central vertex, at least three embedded systems are employed, further improving the robustness. In case of three embedded systems, a triangular configuration may be employed. If one of the at least three embedded systems of the central computing unit fails or its connection with the other embedded systems fails, the cyber-physical system of the vehicle can continue its mission.

The central vertex (cf. central computing unit) in the wheel topology network may be considered as a sensitive core element of the cyber-physical system. Malfunctioning of the central vertex would compromise the operation of the cyber-physical system.

The points or locations at which a redundancy arrangement (e.g. triple modular redundancy) is provided can be determined by means of a fault mode analysis (FMECA). This fault/error mode analysis may allow the identification of critical components or paths within the network based on the selected allowed fault tolerance (e.g. single point failures, double point failures, triple point failures, etc.). Based on the result of the fault mode analysis, some selected vertices in the network are arranged in a redundancy arrangement (e.g. triple modular redundancy). The reliability of each of the components can be analyzed to determine a failure rate (e.g. mean time between failure or the like). From such results it can be monitored which components are sensitive in the moving machine and which are to be protected by applying a redundancy arrangement in order to reduce the failure rate of the moving machine.

The wheel topology may provide for a fault tolerant system. For a wheeled vehicle, it may be advantageous to arrange the redundancy arrangements at or adjacent physical or virtual axles of the vehicle. In some example, the redundancy arrangements are arranged at or adjacent wheels of the vehicle, e.g. at or adjacent each driven wheel of the vehicle. Although more complex, such configuration may further effectively increase the robustness of the system.

It will be appreciated that the invention can be employed in various types of vehicles. In some of the shown embodiments, a wheeled truck is illustrated. However, the vehicle may also be for example an unmanned aerial vehicle (UAV). Advantageously, by employing the method and system according to the invention, the UAV can initiate a safe landing or even continue operation if one of the engines fails, thereby reducing the risk of a crash. Similarly, the invention may also be employed for naval vehicles for example an unmanned surface vehicle (USV). The vehicle may also be a railway vehicle consisting of a series of connected vehicles for example a train.

By applying a wheel topology, the redundancy/fault tolerance of a cyber-physical system of the vehicle can be improved. The entire network of the cyber-physical system may be mathematically represented as a graph of vertices (e.g. embedded systems) and edges (e.g. connection lines) forming a wheel topology. When the network topology is a graph in the form of a star then the graph becomes disjunct if an edge is removed between two vertices and thus the connection is lost. With a wheel topology, a connection between two points can be maintained, even if their direct connection is interrupted. The network can still operate normally while one or more connections are broken and/or interrupted. In this way, the control of critical functionalities can be better safeguarded.

The wheel network topology provides for an improved effective physical redundancy in the cyber-physical system of the vehicle. Each vertex in the wheel topology may be an embedded system (e.g. a computing unit, computer, system-on-a-chip (SoC), multi-processor system-on-a-chip (MP-SoC), etc.). The vertices may be interconnected in such a configuration so that the wheel topology is formed. The vertices or embedded systems (SoCs/MPSoCs) may have a programmable logic part (PL) and a processing system part. Selected vertices or embedded systems may have in the programmable logic part (PL) their logic fabric in redundancy arrangement (e.g. triple modular redundancy).

By means of a fault mode analysis, weaknesses in the cyber-physical system of the vehicle may be identified. This may differ for different types of vehicles, such as wheeled vehicles (e.g. car, truck, etc.), aerial vehicles (e.g. unmanned aerial vehicles), naval vehicles (e.g. boats), etc. The vertices (e.g. embedded systems) with lower reliability in the wheel network can be identified and provided with a redundancy arrangement (e.g. triple modular redundancy in the embedded system).

At least one topology layer may be configured in a wheel network configuration. Optionally, a secondary wheel topology is set up per physical or virtual axle of wheeled vehicle. The secondary wheel topology can make the part of the network associated with each physical or virtual axle of the wheeled vehicle more robust. The physical or virtual axle of the vehicle may be more sensitive to faults and therefore require such secondary wheel topology.

Optionally, the network includes a plurality of topology layers, and wherein at least one topology layer of the plurality of topology layers of the network is arranged in a wheel topology arrangement.

In some examples, a plurality of vertices in the network may be set up in redundancy arrangements. The plurality of redundancy arrangements may be arranged in a wheel topology, with a central vertex (e.g. central embedded system or computer) arranged centrally and connected to each of the plurality of redundancy arrangements. The wheel topology may include many vertices (e.g. more than 50, more than 80, etc.).

According to an aspect, the invention provides for a method of providing a situational awareness for an off-highway dump truck which is arranged for surface mining, the dump truck including a cyber-physical system, wherein a situational awareness system is provided which configured to generate an imaging dataset for processing by the cyber-physical system for enabling semi-autonomous or autonomous operational mode of the dump truck, wherein the situational awareness system is provided with a sensory system comprising: a first electro-optical unit configured for imaging an approximate periphery of the dump truck; a lower deck unit configured for imaging a bottom part of the dump truck; a second electro-optical unit configured for imaging a ground area in a direct vicinity of the dump truck; a dump body inspection unit configured for imaging content in a dump body of the dump truck; a radar unit including at least a first radar unit pointing in a frontward direction of the dump truck and a second radar unit pointing in a rearward direction of the dump truck, the first and second radar units being configured to detect objects; and a third electro-optical unit configured for object detection in an area at least partially surrounding the dump truck, the third electro-optical unit including a first subunit configured for operating in at least one of a visible or a near-infrared wavelength band, a second subunit configured for operating in a thermal infrared wavelength band, and an optical beam splitter configured for separating wavelength bands to spectrally sensitive imaging sensors of the first and second subunits, and wherein the first and second subunits are arranged for co-axial imaging of a scene with an equal instantaneous field of view, wherein the third electro-optical unit includes at least one optical stabilization arrangement, and wherein the third electro-optical unit further includes a further range finder configured for optically ranging detected objects in the scene; and wherein the situational awareness system further includes a data synchronization system configured to synchronize the imaging dataset obtained by means of each unit of the sensory system, wherein the data synchronization system is configured to provide the synchronized imaging dataset to the cyber-physical system of the dump truck.

According to an aspect, the invention provides for a use of the situational awareness system according to the invention for generating a synchronized dataset.

According to an aspect, the invention provides for a situational awareness system for an off-highway dump truck which is arranged for surface mining, the dump truck including a cyber-physical system, wherein the situational awareness system is configured to generate an imaging dataset for processing by the cyber-physical system for enabling semi-autonomous or autonomous operational mode of the dump truck, wherein the situational awareness system includes: a first electro-optical unit configured for imaging an approximate periphery of the dump truck; a detection system for object detection in an area at least partially surrounding the dump truck; a range finding system configured to optically range objects in a scene; a second electro-optical unit comprising at least a first subunit and a second subunit, wherein the first subunit is configured to operate in at least one of a visible or a near-infrared wavelength band, and wherein the second subunit is configured to operate in a thermal infrared wavelength band, wherein the first and second subunits are arranged for co-axial imaging of a scene with an equal instantaneous field of view, wherein the second electro-optical unit further includes an optical splitting subunit arranged for separating wavelength bands to spectrally sensitive imaging sensors of the first and second subunits.

Optionally, the situational awareness system further includes a data synchronization unit configured to synchronize retrieved images. The present invention may provide for a situational awareness system (SAS) that generates a dataset to be transferred to the cyber-physical system (CPS).

BRIEF DESCRIPTION OF THE DRAWINGS

The foregoing and the following detailed description are better understood when read in conjunction with the appended drawings. For the purposes of illustration, examples are shown in the drawings; however, the subject matter is not limited to the specific elements and instrumentalities disclosed.

In the drawings.

DESCRIPTION OF EMBODIMENTS

The present invention discloses a situational awareness system that generates a dataset to be transferred to the cyber-physical system of a vehicle for example an off-highway dump truck, that can process the dataset in the different operational modes of the semi-autonomous or autonomous vehicle.

Figure 1:
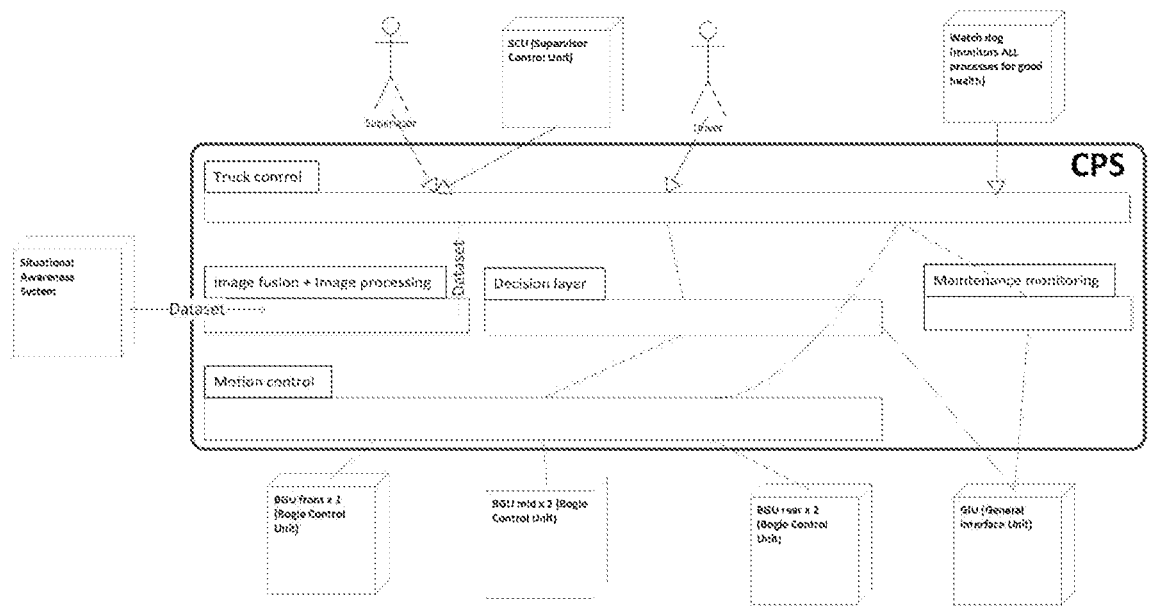
FIG. 1 illustrates the top-level block diagram of the cyber-physical system (CPS) and its connection to the situational awareness system (SAS)

FIG. 1 shows for example an off-highway dump truck that can process the dataset in the different operational modes of the semi-autonomous or autonomous off-highway dump truck.

Figure 2:
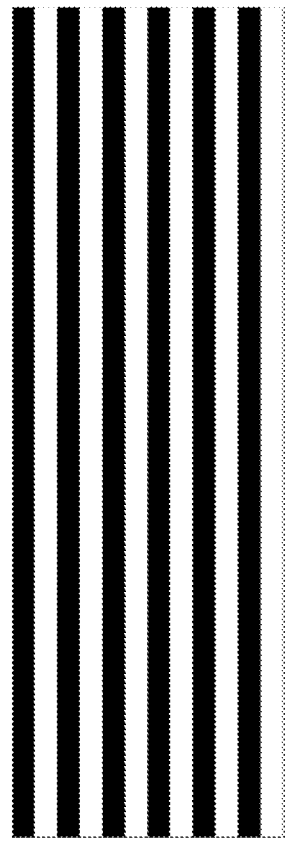
FIG. 2 illustrates the identification requirement of the model of a person.

The situational awareness system (SAS) is designed for identifying persons moving or standing in the surface mine. Those persons are many times smaller than the vehicles and other objects that are present in the surface mine. Thus, solving the identification problem for persons automatically solves the identification problem of the other objects of the surface mine. A person in identification requirements is modelled by a rectangle as shown in FIG. 2 where the width contains 6 black and 6 white lines. The 12 lines are equally distributed over the width of a person. A typical dump truck of 240 metric ton driving at a velocity of 50 km/h should have a braking distance of 50 m in a horizontal plane. Assuming a safety factor of two, it may be required that no collision occurs between such a dump truck, in the given state, and a person (1.75 m×0.6 m) located at 100 meter from the forward travelling dump truck. This can be translated to the general requirement for any dump truck of this category in a forward and backward angular resolution θ according to the equation:

$$\theta = \arctan(((\text{smallest dimension of object})/(\text{number of lines}))/(\text{safetyfactor} * \text{brakingdistance})),$$

where the smallest dimension of a person is 0.6 m, the number of lines for identification is 12, the safety factor is taking equal to 2 and the braking distance has a value of 50 m. This results in an angular resolution requirement of θ=0.5 mrad, corresponding to an angle of approximately 0.029 degrees. This angular resolution requirement is the core requirement for the situational awareness system. The harsh environment constraints lead to a situational awareness system containing a long-range electro-optical unit that operates in multiple wavelength bands such as to capture the signals emitted or reflected by the objects. For that purpose, electro-optical subunits can be used that operate in different spectral bands. A spectral splitter unit separates the incoming radiation in its respective spectral bands and sends the created beams to their respective spectral electro-optical subunits. The physical arrangement of the spectral electro-optical units is such that the optical axis of each of the electro-optical subunits coincides in front of the splitter unit, in other words, the different electro-optical units are aligned in an optical coaxial geometry. This has the advantage to remove the parallax problem between the different electro-optical subunits. Another characteristic of the long-range electro-optical unit is image fusion. To create the image fusion, it can be required that each of the spectral subunits has the same instantaneous field of view (IFOV) and that the change of distortion with the FOV is equal between the spectral units in the respective overlap zones. In some embodiments the distortion will be reduced to less than 2 image pixels. The equality of the IFOV and the distortion match between the electro-optical subunits eliminates the need for image registration, like the creation of a homography matrix. The low-level image processing to be performed on the captured spectral images is reduced by choosing equal IFOV and equal distortion and results in a reduced time lag in the transfer of the image data. The off-road environment, including bumps and potholes in the road, requires that the long-range electro-optical unit be mounted on a two-axis gyro-stabilized platform such that the line of sight (LOS) of the long-range electro-optical unit can be kept at the same position in azimuth and elevation with respect to the inertial reference plane. The LOS stability requirement in azimuth and elevation for the controller shall be at least 0.1 mrad. An eye-safe laser rangefinder unit with laser beam steering subunit is mounted on the two-axis gyro-stabilized platform. The laser rangefinder provides range data to objects in the scenery. The selection of the objects to be ranged is performed by the cyber-physical system based on the analysis of the data set. A default laser ranging is performed at least at three different points lying in the vertical plane defined by the normal to the inertial reference plane and the optical axis of the long-range electro optical unit. The long-range electro-optical units are the essential parts for collision avoidance and emergency braking.

The situational awareness system (SAS) needs other units to be fully operational. These additional units are the short-range electro-optical units (SEOU), the ground-looking electro-optical units (GEOU), the dump body inspection units (DBIU), the lower deck units (LDU), the microwave radar units (RU) and the data synchronization unit (DSU). The integration of all these subunits results in a fully all-weather 24/7 operational situational awareness system.

The harsh environment constraints lead to a situational awareness system containing a long-range electro-optical unit that operates in multiple wavelength bands such as to capture the signals emitted or reflected by the objects.

Figure 3:
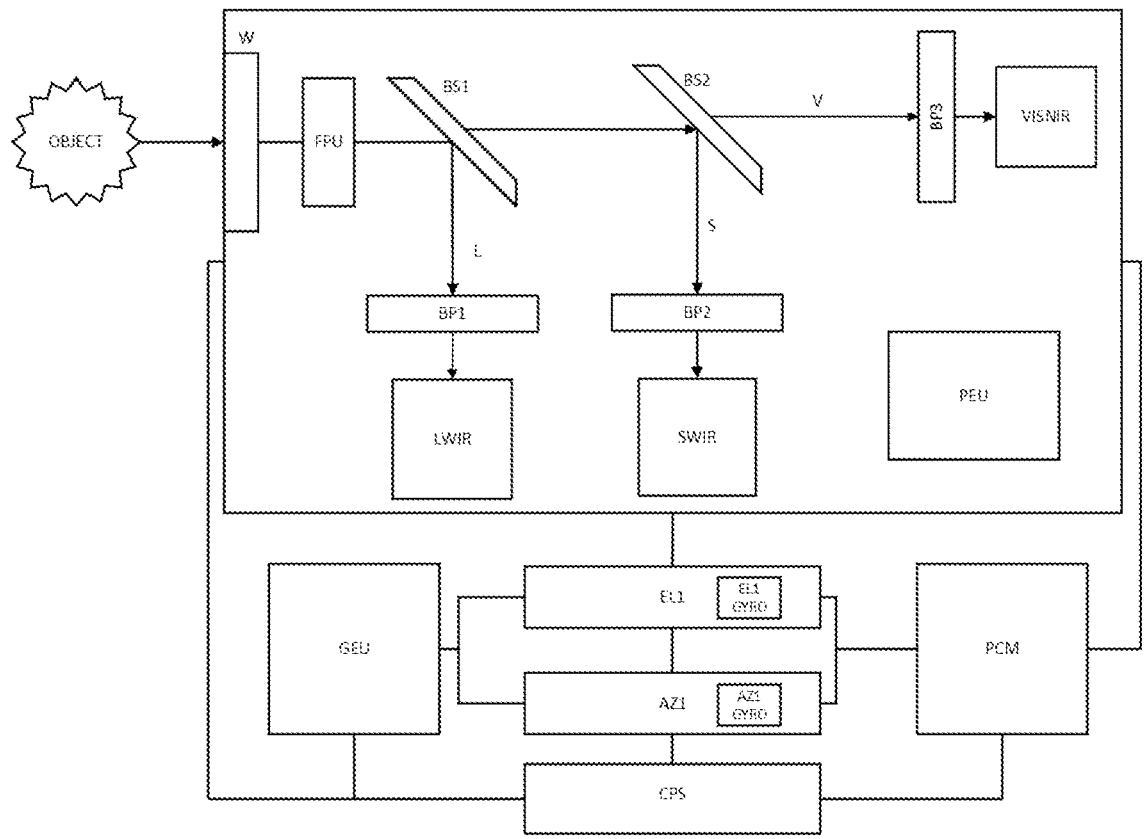
FIG. 3 illustrates the optical schematic of the long-range multi-spectral electro-optical unit (LEOU) having 3 spectral bands (L, S, V)

For that purpose, electro-optical subunits can be used that operate in different spectral bands. FIG. 3 shows the schematics of the long-range multi-spectral electro-optical unit.

In a preferred embodiment there are 3 wavelength bands: the visible and near-infrared band (V), the short-wave infrared band (S) and the long-wave infrared band (L). There are six spectral splitter configurations possible that are (V, L, S), (V, S, L), (S, V, L), (S, L, V), (L, S, V) and (L, V, S). The choice of the configuration depends on available optical substrate materials and thin-film coating technology. A typical arrangement of 2 beam splitters results in the configuration (L, S, V) as shown in FIG. 3.

Radiation from the object enters the unit through a window W and passes through a fine pointing unit (FPU) where it propagates to a beam splitter BS1 where the long-wave infrared radiation is separated and send through a bandpass filter BP1 where the radiation is collected by the long-wave infrared objective LWIR that creates an image of the object. The bandpass filter BP1 is adapted to the specific soils and rocks environment of the surface mine to obtain maximum contrast in the scene within the LWIR spectral band. This maximum contrast is wavelength dependent.

The short-wave infrared and the visible and near-infrared radiation are transmitted through beam splitter BS1 towards beam splitter BS2 where the short-wave infrared is separated and send through a bandpass filter BP2 where the radiation is collected by the short-wave infrared objective SWIR that creates an image of the object. The bandpass filter BP2 is also adapted to the specific soils and rocks environment of the surface mine to obtain maximum contrast in the scene within the SWIR spectral band. The visible and near infrared radiation is transmitted through a bandpass filter BP3 where the radiation is collected by the visible and near-infrared objective VISNIR that creates an image of the object. The bandpass filter BP3 is also adapted to the specific soils and rocks environment of the surface mine to obtain maximum contrast in the scene within the VISNIR spectral band.

In the case of 4 wavelength bands there can be 24=4! possible splitter unit configurations consisting of 3 beam splitters in each configuration.

The long-range electro-optical unit contains a proximity electronics unit (PEU) that processes the data from the different sensors of the respective LWIR, SWIR and VIS-NIR subunits. The proximity electronics unit (PEU) prepares the dataset from the LEOU that is to be transferred to the cyber-physical system (CPS). A power conditioning module (PCM) transforms the raw vehicle electric power of 10-33 VDC to stable voltages to be used by the subunits of the long-range electro-optical unit (LEOU) and provides also filtering functions against radiated and conducted electromagnetic interferences (EMI). The LEOU is further interfaced with the gimbal electronic unit (GEU) that drives the azimuth positioning unit (AZ1) and the elevation position unit (EL1).

The physical arrangement of the spectral electro-optical units is such that the optical axis of each of the electro-optical subunits coincides in front of the splitter unit, in other words, the different electro-optical units are aligned in an optical coaxial geometry. This has the advantage to remove the parallax problem between the different electro-optical subunits. Another characteristic of the long-range electro-optical unit is image fusion. To create the image fusion, it can be required that each of the spectral subunits has the same instantaneous field of view (IFOV) and that the change of distortion with the FOV is equal between the spectral units in the respective overlap zones. The equality of the IFOV between the electro-optical subunits and the distortion match eliminates the use of geometric transformations between the captured spectral images and thus improves the data rate of the long-range electro-optical unit.

This equality of the IFOV results in a long-range multi-spectral electro-optical unit having for each spectral band another effective focal length leading to different total field of views. There can be only partial overlap of the total field of views of the spectral subunits. The field of view overlap function can be used by the cyber-physical system (CPS) in the decision processes of the operational modes of the autonomous or semi-autonomous hybrid dump truck.

Figure 4:
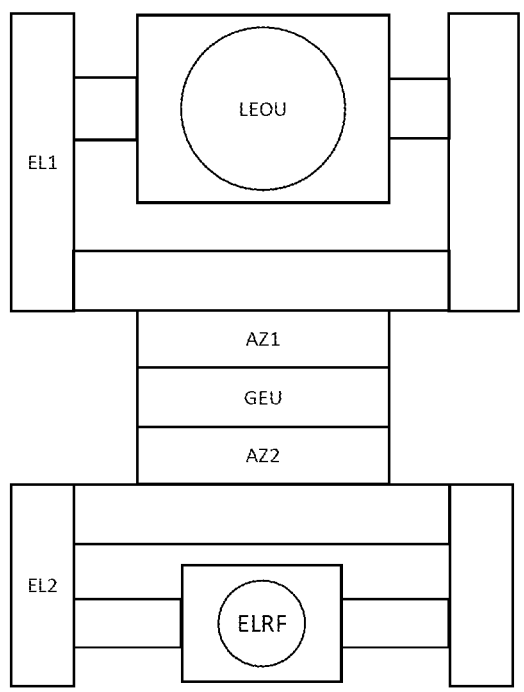
FIG. 4 illustrates the schematic of the electronic unit of the multi-spectral camera.

The off-road environment, including bumps and potholes in the road, requires that the long-range electro-optical unit be mounted on a two-axis gyro-stabilized platform, as shown in FIG. 4, such that the line of sight (LOS) of the long-range electro-optical unit (LEOU) can be kept at the same position in azimuth and elevation with respect to the inertial reference plane. The LOS stability requirement in azimuth and elevation for the controller shall be better than 0.5 mrad. A preferred embodiment of the two-axis stabilized platform has a gyro-stabilized line of sight <0.1 mrad. The LEOU position is generated by drive signals coming from the gimbal electronic unit (GEU) and send to the azimuth actuator 1 (AZ1) and elevation actuator 1 (EL1). An eye-safe laser rangefinder unit (ELRF) with laser beam steering subunit is mounted on another two-axis gyro-stabilized platform. The ELRF position is generated by drive signals coming from the gimbal electronic unit (GEU) and send to the azimuth actuator 2 (AZ2) and elevation actuator 2 (EL2). The eye-safe laser rangefinder provides range data to objects in the scenery. The selection of the objects to be ranged is performed by the cyber-physical system (CPS) based on the analysis of the data set. A default laser ranging is performed at least at three different points, lying in the vertical plane defined by the normal to the inertial reference plane and the optical axis of the long-range electro optical unit. A preferred embodiment is equipped with the following long-range multi-spectral electro-optical system consisting of electro-optical systems having a fixed instantaneous field of view of 500 microrad.

Figure 5:
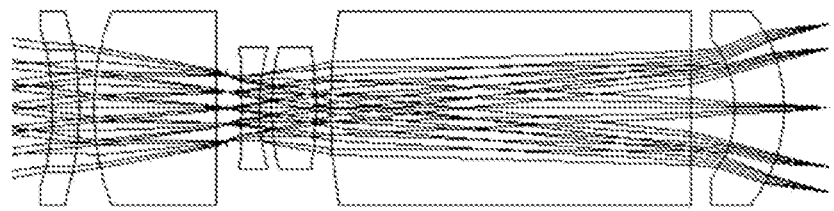
FIG. 5 illustrates the 2D optical layout of a short-wave infrared (SWIR) objective.
Figure 6:
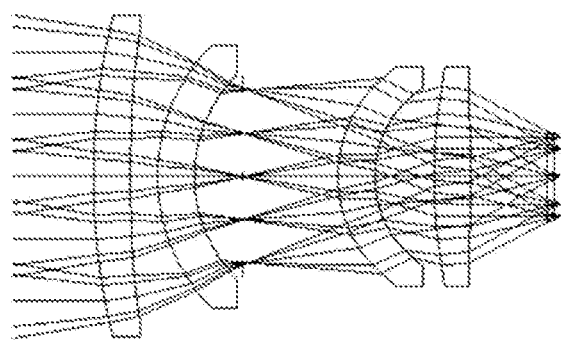
FIG. 6 illustrates the 2D optical layout of a long-wave infrared (LWIR) objective.
Figure 7:
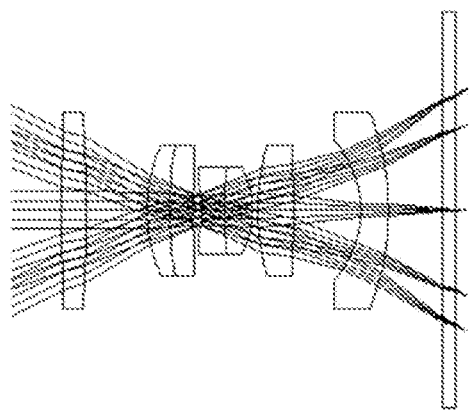
FIG. 7 illustrates the 2D optical layout of a visible and near-infrared (VISNIR) objective.
Figure 8:
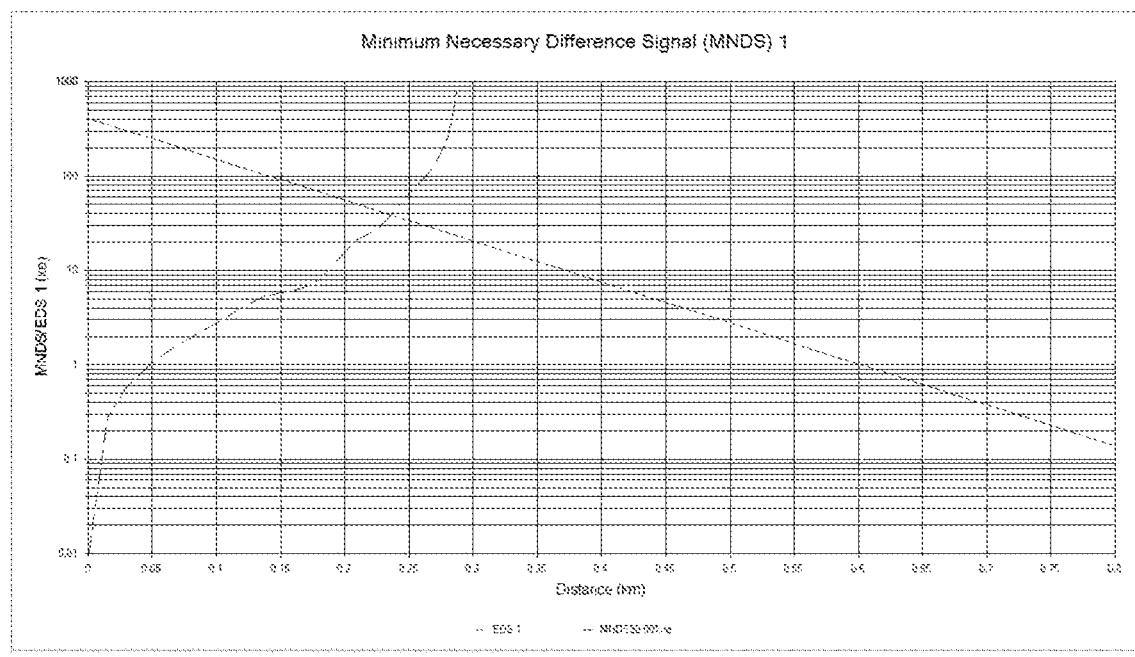
FIG. 8 illustrates the minimum resolvable contrast (MRC) of the SWIR electro-optical unit.
Figure 9:
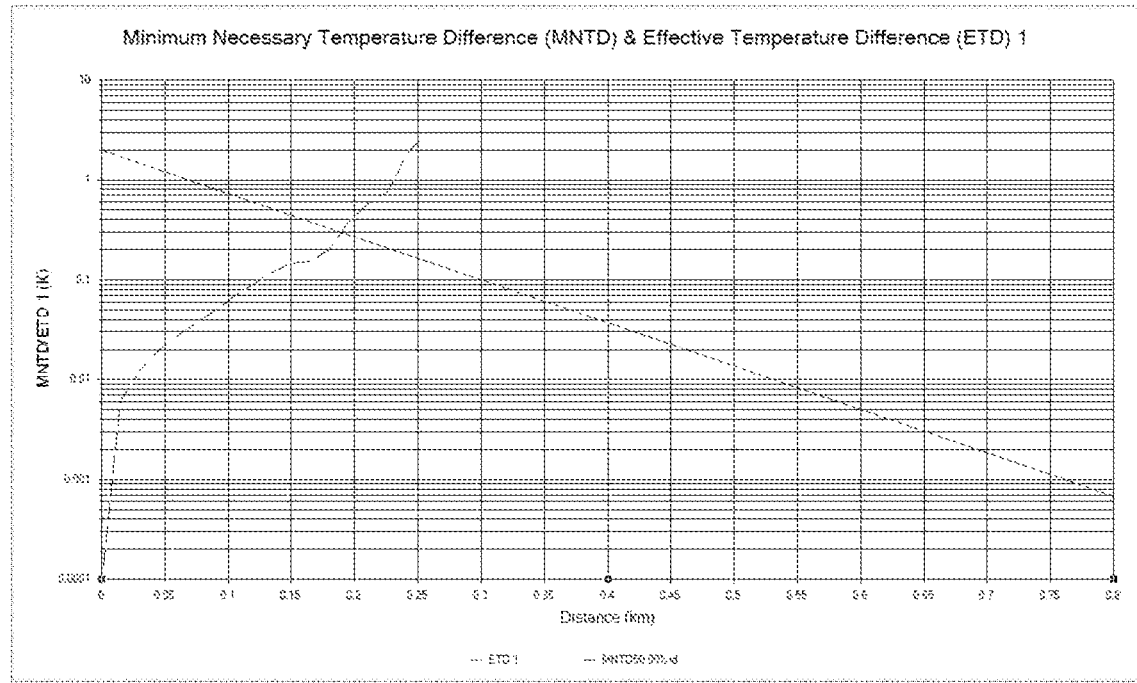
FIG. 9 illustrates the minimum resolvable temperature difference (MRTD) of the LWIR electro-optical unit.
Figure 10:
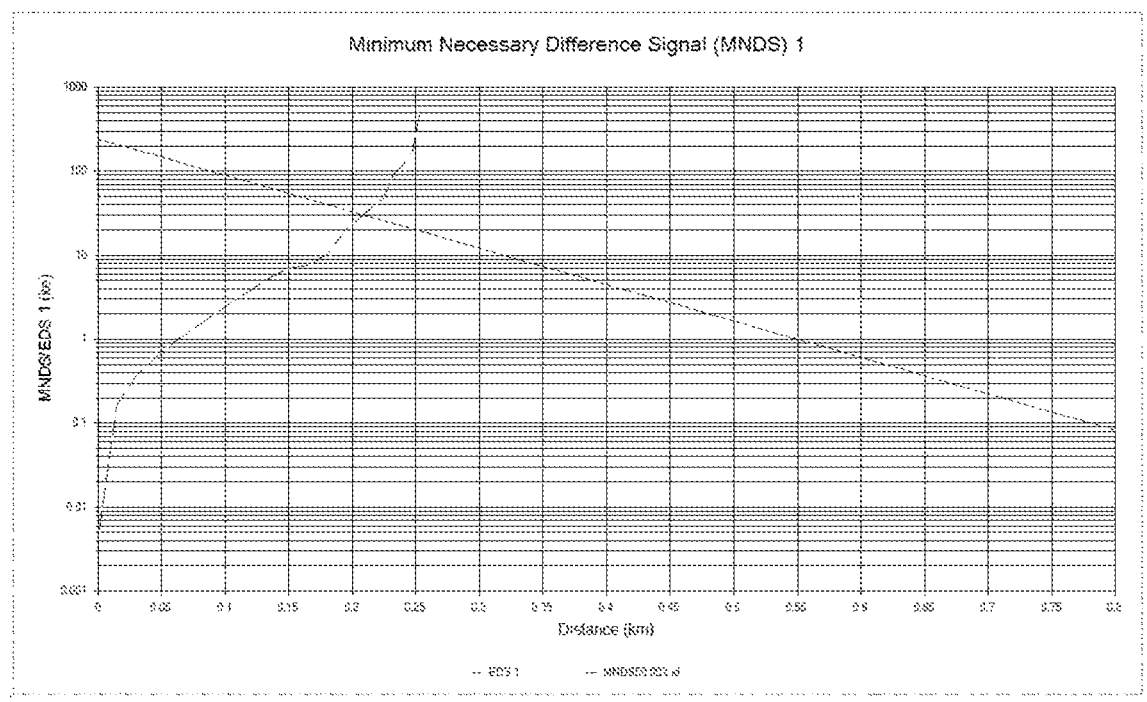
FIG. 10 illustrates the minimum resolvable contrast (MRC) of the VISNIR electro-optical unit.

FIG. 5 shows a short-wave infrared (SWIR) thermal camera, equipped with an InGaAs PIN-photodiode detector having 640 horizontal pixels and 480 vertical pixels having a pixel size of 15 µm×15 µm. The SWIR subunit is operating in the wavelength band 0.9 µm to 1.7 µm and has a total horizontal field of view of 18° and a total vertical field of view of 15°. The effective focal length of the SWIR camera is 30 mm and has a f-number of 5.88. The FIG. 8 show that the SWIR camera has an identification range for a person (1.75 m×0.6 m) of 240 m when the effective extinction coefficient is 9.99/km that is compliant with the minimum requirement of 100 m. FIG. 6 shows a long-wave infrared (LWIR) thermal camera, equipped with a high resolution uncooled microbolometer having 640 horizontal pixels and 512 vertical pixels having a pixel size of 17 µm×17 µm. The LWIR subunit is operating in the wavelength band 8 µm to 14 µm. The LWIR subunit has a total horizontal field of view of 18° and a total vertical field of view of 14°. The effective focal length of the LWIR camera is 34 mm and has a f-number of 1. The FIG. 9 shows that the LWIR camera has an identification range for a person (1.75 m×0.6 m) of 190 m when the effective extinction coefficient is 9.99/km that is compliant with the minimum requirement of 100 m. FIG. 7 shows a visible and near-infrared (VISNIR) camera, equipped with a high-resolution CMOS sensor having 2048 horizontal pixels and 2048 vertical pixels having a pixel size of 5.5 µm×5.5 µm. The VISNIR subunit is operating in the wavelength band 0.4 µm to 0.9 µm and has a total horizontal field of view of 59° and a total vertical field of view of 59°. The effective focal length of the VISNIR camera is 11 mm and has a f-number of 6.47. The FIG. 10 shows that the VISNIR camera has an identification range for a person (1.75 m×0.6 m) of 210 m when the effective extinction coefficient is 9.99/km that is compliant with the minimum requirement of 100 m.

The effective extinction coefficient on a clear day is 0.2/km and thus the abovementioned effective extinction coefficient refers to very adverse weather conditions related to meteorological visibility.

The number of short range electro-optical units to be placed on the dump truck in the horizontal plane for a correct operating situational awareness system is found through the sequential calculation of the following equations, when provided with the adequate data that is WidthOfPerson=0.6 m, NumberOfCycles=6, MinimumStitchingFactor=0.8:

$$IFOV = \left[\frac{\left(\frac{WidthOfPerson}{2*NumberOfCycles}\right)}{DistanceOfPerson}\right]$$

$$EffectiveFOVOnOneSide = \left(\frac{\pi}{MinimumStitchingFactor}\right)$$

$$TotalNumberOfPixelsForPerimeterOnOneSide = \left(\frac{EffectiveFOVOnOneSide}{IFOV}\right)$$

$$NumberOfCameras = 4*ceil\left(\frac{TotalNumberOfPixelsForPerimeterOnOneSide}{NumberOfHorizontalPixelsOfCamera}\right)$$

The degrees of freedom in the above equations are DistanceOfPerson and Number OfHorizontalPixelsOfCamera.

Figure 11:
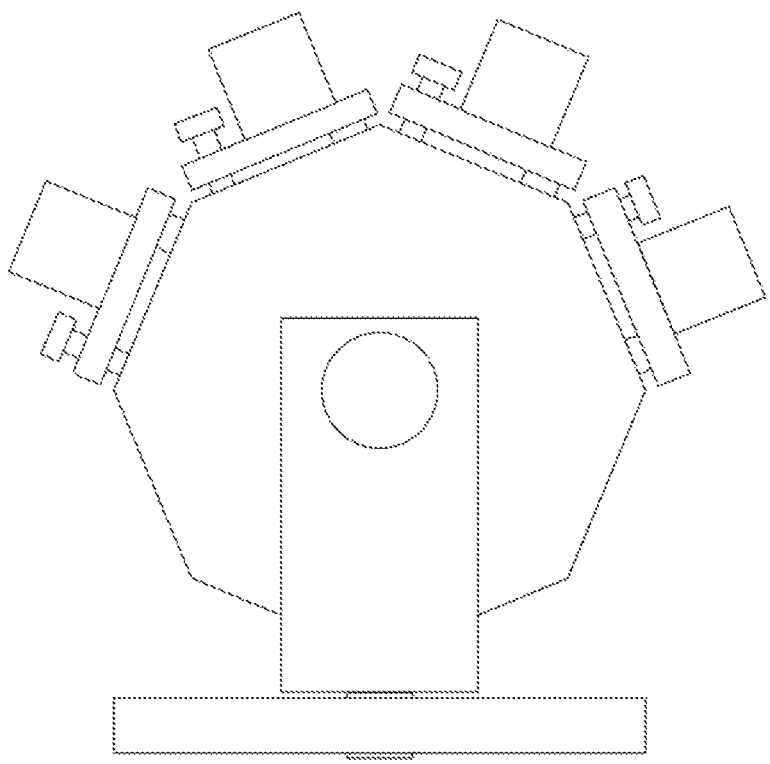
FIG. 11 illustrates the top view of the octagon bracket containing 4 short-range electro-optical units (SEOU) mounted on faces of an octagon prism that is suspended in a two-axis gyrostabilized gimbal.
Figure 12:
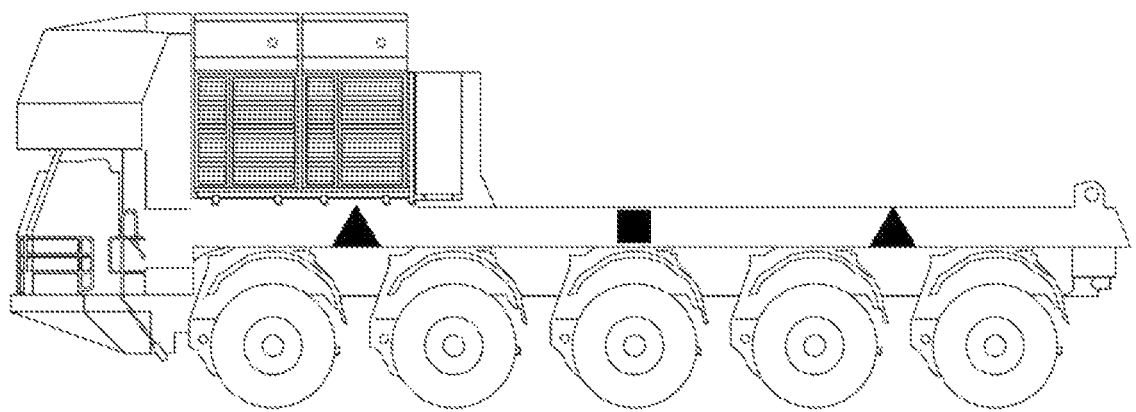
FIG. 12 illustrates a preferred mounting plane (black rectangle) of the short-range electro-optical units (SEOU) and the preferred mounting plane of the ground looking electro-optical units (GEOU) (black triangles) on the left side of a 5 axles dump truck.
Figure 13:
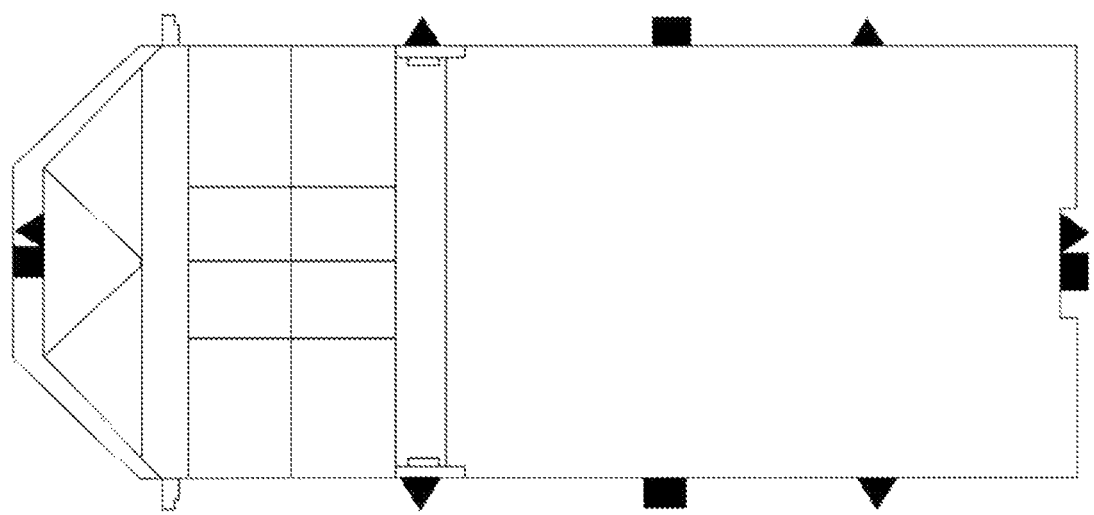
FIG. 13 illustrates the positions (black rectangles), seen from the top of the dump truck, of the short-range electro-optical units (SEOU) and the positions (black triangles) of the ground looking electro-optical units (GEOU) as described in a preferred embodiment.

In a preferred embodiment of the short-range electro-optical units (SEOU) 16 units operating in the VISNIR having each 2048 horizontal pixels and 1088 vertical pixels with pixel size of 5.5 µm×5.5 µm may be employed. The total horizontal field of view of the objective of each short-range electro-optical unit is 56.25° and the effective field of view is 11 mm. The short-range electro-optical units are mounted in four assemblies of 4 electro-optical units. FIG. 11 shows the physical location of each short-range electro-optical unit in a two-axis gyro-stabilized assembly. The optical axis of each short-range electro-optical unit is parallel to the normal of the faces of an octagonal prism. One of the axes of the prism is connected to the two-axis gyro-stabilized gimbal. Each assembly of 4 short-range electro-optical units creates a total field of view of 180° (H)×31° (V) on each side of the dump truck. The effective overlap angle between the short-range electro-optical units is 11.25°. The individual optical axes are factory calibrated to lay in one plane. This results in a rugged assembly with an easy calibration of the assembly such that it is coplanar to the inertial plane of the dump truck. The coplanarity calibration is executed on each of the 4 assemblies using the gyroscope outputs of each assembly. FIG. 12 shows a preferred mounting plane (black rectangles) of the short-range electro-optical assembly (SEOU) on the left side of a 5 axles dump truck. FIG. 13 shows a top view of the dump truck with the positions of the SEOUs (black rectangles) in a preferred embodiment.

In a preferred embodiment there are ground-looking proximity cameras (GEOU) operating in the VISNIR that observe the vicinity of the dump truck. These ground-looking cameras observe each a trapezoidal patch around the truck having a VicinityHeight given by the equation:

$$VicinityHeight = \frac{HeightAboveGround}{\tan(0.5*IFOV*NumberOfVerticalPixelsOfCamera)},$$

where HeightAboveGround is the height above ground level at which the short-range electro-optical units are attached to the dump truck. For the preferred embodiment, a VicinityHeight=8.96 m when the HeightAboveGround=2.5 m can be employed.

$$VicinityWidth = HeightAboveGround*2$$
$$*\tan\left(0.5*NumberOfHorizontalPixelsOfGroundCamera\right.$$
$$\left.*\arctan\left(\frac{vpixelground}{EFLGroundSelected}\right)\right)$$

A preferred embodiment results in a Vicinity Width=10.46 m.

The dimensions of the dump truck are length 20 m and width 7.6 m resulting in 2 GEOU on each side of the truck and 1 GEOU in the front of the truck and 1 GEOU at the rear of the truck. The positions of the GEOU are given as black triangles in FIG. 12 and FIG. 13.

Figure 14:
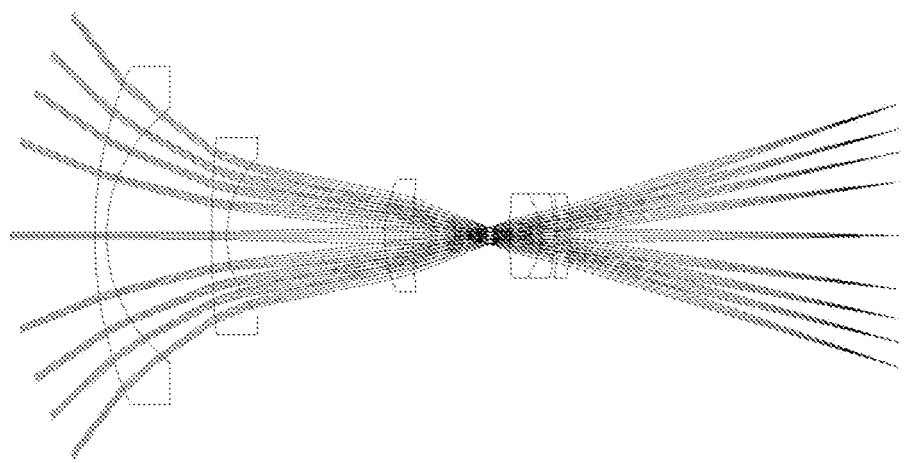
FIG. 14 illustrates the 2D optical layout of the ground-looking objective of the GEOU.

FIG. 14 gives a 2D layout of the GEOU objective in a preferred embodiment. The preferred embodiment consists of GEOU objective with an effective focal length of 5 mm operating at a f-number=22 with a total field of view of 106°.

The fused multi-spectral image is created by the cyber-physical system based on the weighing of the signal to noise ratio at each individual pixel. A synthetic color space (L, S, V) is created, like the classical (R, G, B) in video signals, where L represents the LWIR signal, S represents the SWIR signal and V represents the VISNIR signal. The weighing of (L, S, V) is performed by the cyber-physical system based on the operational mode of the dump truck. The LWIR image has a higher weight in the navigation task performed by the cyber-physical system because the navigation of the dump truck uses emissivity variations of objects in the scene and optical flow data.

Persons have an emissivity of approximately 0.99 and can be considered as effective blackbodies. The LWIR image is almost independent of the position of the sun and thus from shadows. The LWIR image allows driving the truck at night without active illumination. The SWIR image aids in the observation of the scenery in the case of fog and dust.

Figure 17:
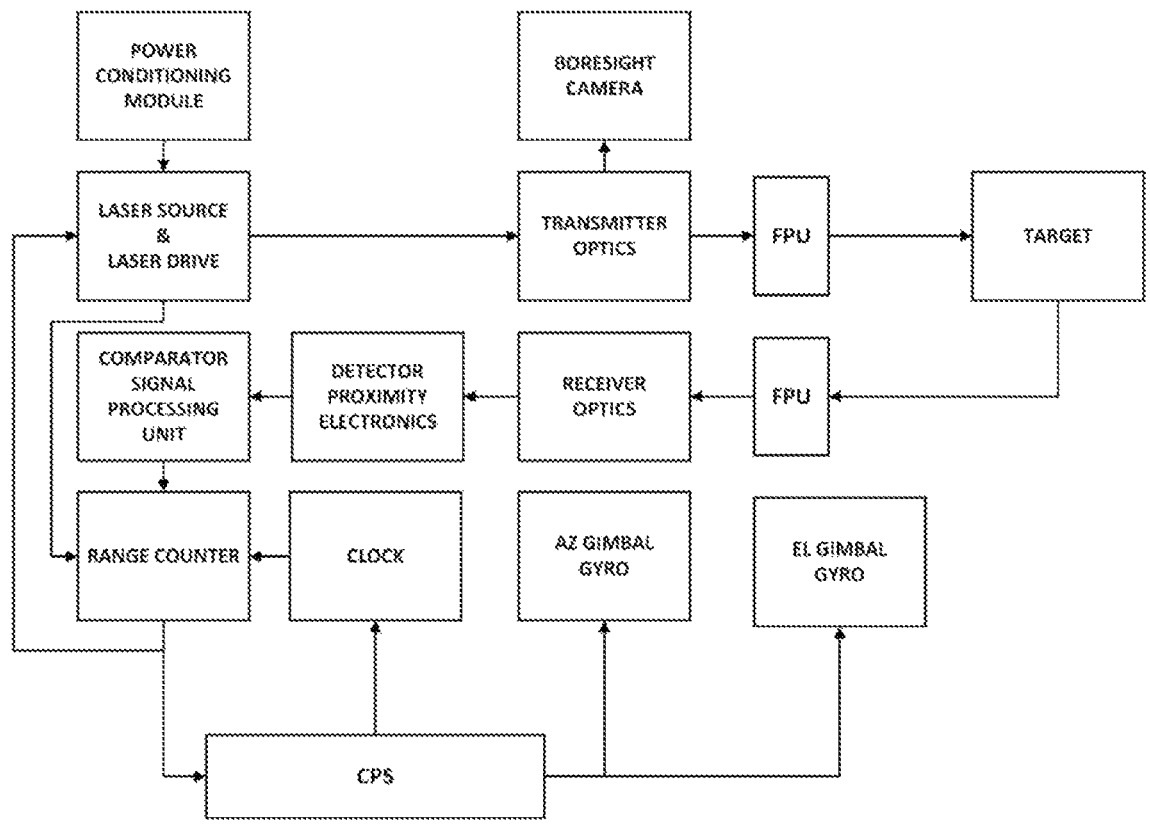
FIG. 17 illustrates a block diagram of the eye-safe laser rangefinder as subunit of the LEOU.

FIG. 17 shows a block-diagram of a preferred embodiment of the eye-safe laser range finder (Class 1 according to IEC60825-1:2014) that operates at a wavelength of 1.55 μm. The range gate resolution of the eye-safe laser range finder is 1 m. The false alarm rate of the eye-safe laser range finder is <1% and the range accuracy of the ELRF is <0.5 m. The ELRF gives valid ranges of 0 m to 2000 m for person-sized objects having an albedo of 30% under a meteorological visibility of 10 km and can discriminate 5 objects. The position of the truck in the surface mine is obtained through laser-based 3D true range multilateration using cooperative reflector beacons placed along the perimeter of the open mine pit. The reflector beacons have a precise geodesic position and are used to calibrate the truck's three-dimensional position. This positional recalibration of the truck is needed due to the drift of the gyros.

This calibration can be initiated at any moment by the cyber-physical system through the protocol with the situational awareness system. The distance to the reflector beacons is obtained by using the eye-safe laser rangefinder of the LEOU.

Figure 15:
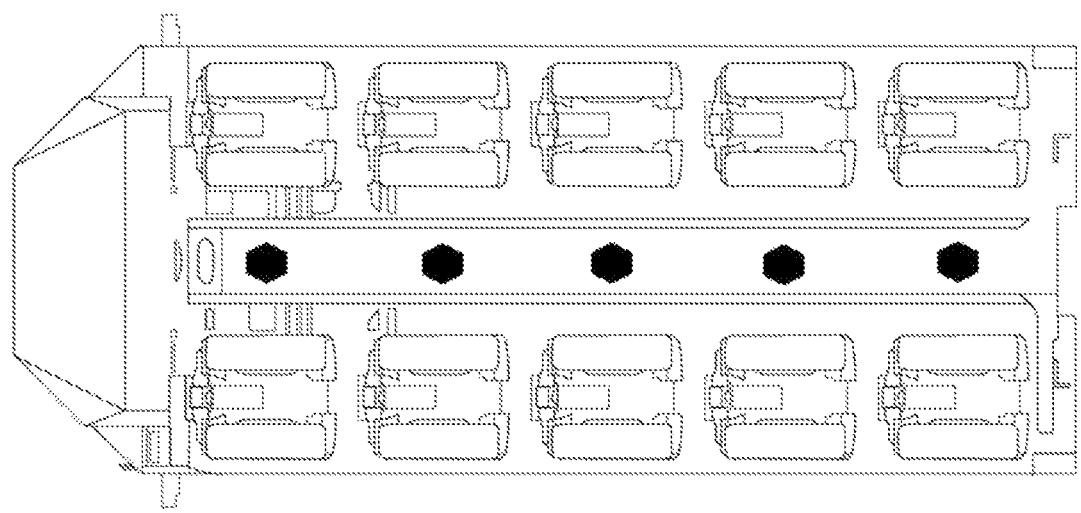
FIG. 15 illustrates the positions (black hexagons), seen from the bottom of the dump truck, of the lower deck units (LDU) consisting each of 2 LWIR/VISNIR camera units.

The bottom part of the dump truck is observed by lower deck units (LDU). Each axle of the truck is equipped with one LDU that contains two uncooled LWIR camera units. The set of LDUs is shown in FIG. 15 and their preferred positions are marked with hexagons. The LDU data allows the CPS to verify clearance of the areas of the wheels and to inspect the state of the tires prior to driving. The LDU data also provides information to the CPS in case of abnormal heating of the tires or any abnormal heating up in the bogie units of the dump truck.

Figure 16:
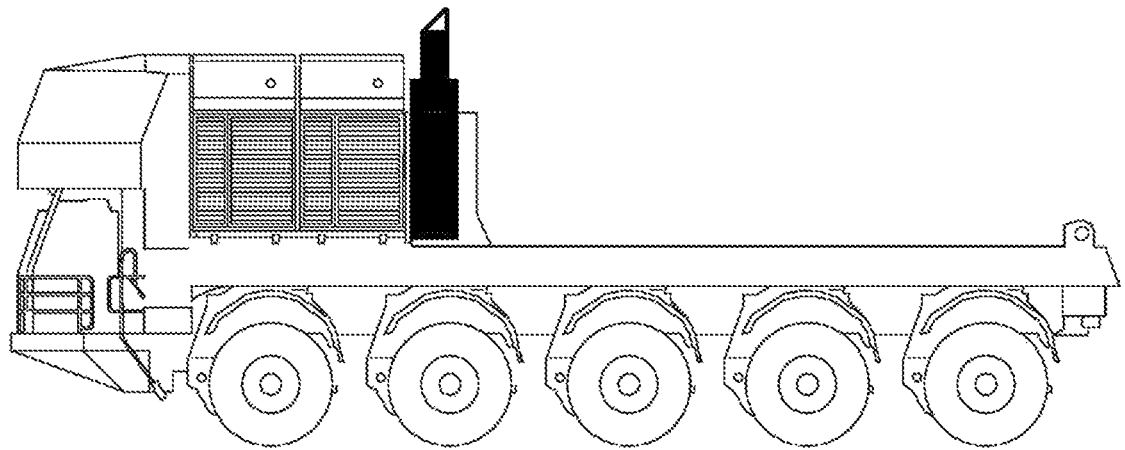
FIG. 16 illustrates a dump body inspection unit (DBIU) consisting of a telescopic arm with pan and tilt unit equipped with a VISNIR and LWIR camera unit.

The situational awareness system is equipped with a dump body inspection unit (DBIU) shown in FIG. 16 to supervise the safe loading and unloading operations of the dump body. The dump body inspection unit consists of a telescopic arm with pan and tilt mechanism at its end such that a LWIR and VISNIR electro-optical units can inspect the dump body status as well as the operations related to the loading and unloading of the dump body. The DBIU data allows the CPS to check for an excentre loading of the dump body.

The situational awareness system (SAS) is equipped with a radar unit (RU) pointing in the frontward direction and one radar unit (RU) pointing into the rearward direction to detect medium to large objects in adverse weather conditions where the electro-optical units cannot operate anymore. This could occur in very dense fog, heavy snow fall, blizzards, and the like where only the radar can operate. Under these adverse weather conditions, the dump truck can operate with reduced performance that means mainly a strong reduction of the velocity of the dump truck. In a preferred embodiment the imaging radar has 48×48 antennas operating at a frequency of 77-81 GHz. The imaging radar has an azimuth resolution of 1.25° and an elevation resolution of 2°. The field of view of the imaging radar is 100° (H)×30° (V). An alternative embodiment for the radar unit (RU) operates in the 24 GHz band. This band is mainly used for short to medium range radar.

Figure 20:
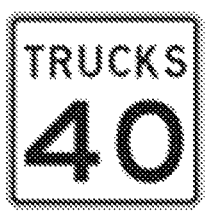
FIG. 20 illustrates a USA speed limit traffic sign.

When the vehicle is a passenger car then the parameters characterizing the situational awareness system can be adapted accordingly. In some cases, the LEOU of the situational awareness system for a passenger car may be required to read numbers, characters, and symbols on traffic signs. As an example, a speed limit sign in the USA has a dimension of 609 mm×609 mm as shown in FIG. 20. Experiments with advanced driver assistants (ADAS) recommend that a situational awareness system is capable of sampling the traffic signs at minimum in a 32×32 pattern. This sampling should be applicable at a distance of 200 m. This results in the smallest dimension to be of 19 mm of size in horizontal and vertical direction. The instantaneous field of view requirement for a passenger car becomes: IFOV=arctan(0.019/200)=0.0054° that is equivalent to an angle of 95 microradian. Assuming a CMOS detector with a pixel pitch of 5.5 micron then a requirement for the effective focal length of the visible channel of the LEOU of EFL=57.89 mm can be obtained.

Figure 21:
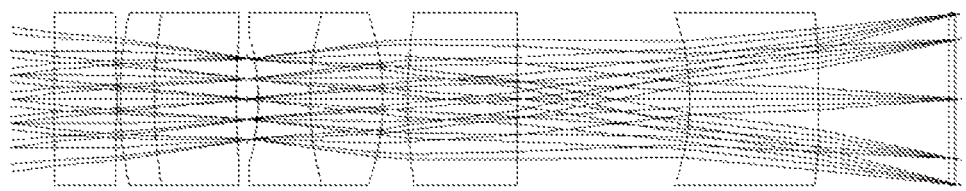
FIG. 21 illustrates the 2D optical layout of a visible objective for a passenger car application.
Figure 24:
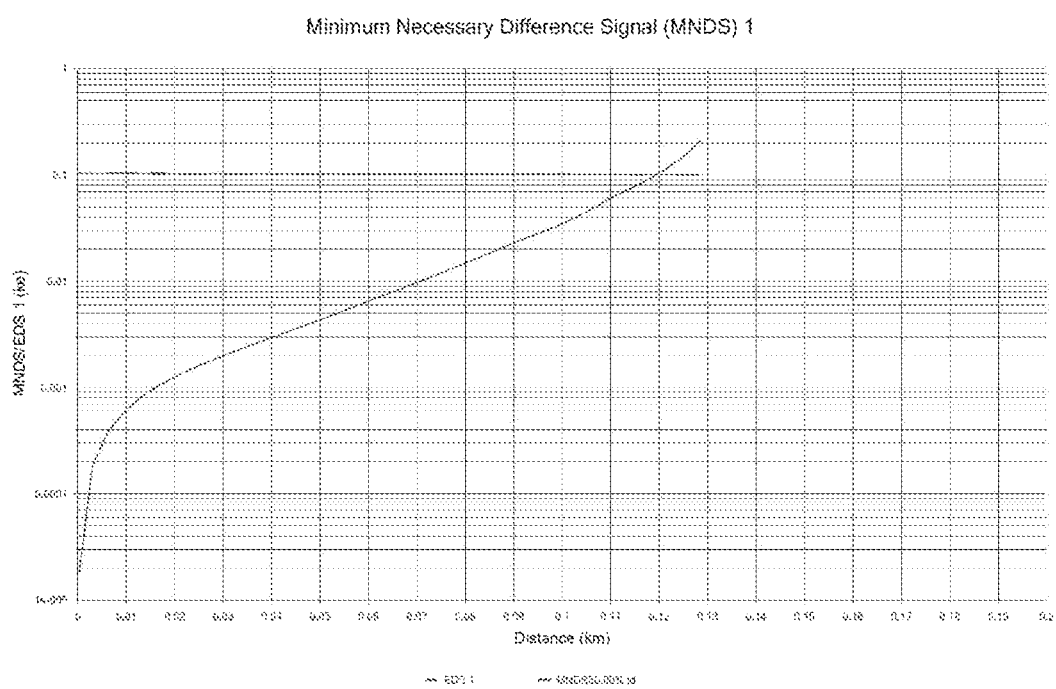
FIG. 24 illustrates the minimum resolvable contrast (MRC) of the VIS electro-optical unit for a passenger car application.

An optical layout of the visible subunit of the LEOU for a passenger car is given in FIG. 21. The optical layout has also the characteristic of being athermal from −40° C. to +85° C. and distortion free. The field of view of the visible channel is approximately 11° (H)×11° (V). The identification range performance is given in FIG. 24 and shows the capability of the VIS channel under an atmosphere with an effective extinction coefficient of 0.2/km and overcast sky conditions to read squares of side length 19 mm under random vibrations with a RMS amplitude of 0.1 mrad in the X and Y directions of the sensor image plane and a linear image motion of 1 mrad/s.

Figure 22:
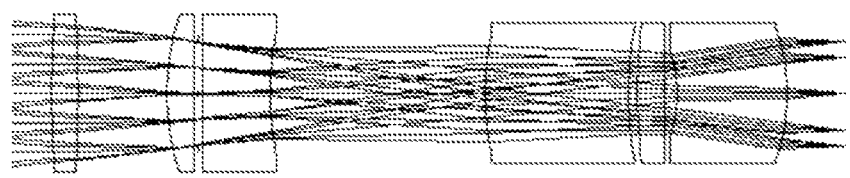
FIG. 22 illustrates the 2D optical layout of a short-wave infrared objective for a passenger car application.
Figure 23:
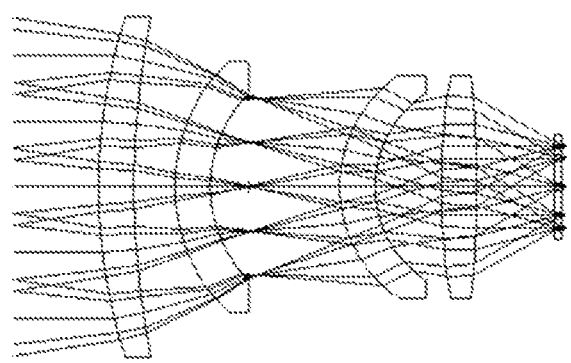
FIG. 23 illustrates the 2D optical layout of a long-wave infrared objective for a passenger car application.

For the short-wave infrared part of the LEOU an InGaAs focal plane array with a pixel pitch of 15 micron may be assumed. As instantaneous field of view (IFOV) is small an integer multiplier of the IFOV applicable for the VIS channel can be employed. For the SWIR two times the IFOV of the visible channel may be used. This allows for simple pixel binning processing of the dataset as the ratio is a factor two. The requirement for the effective focal length of the short-wave infrared channel of the LEOU yields EFL=78.94 mm. An optical layout of the short-wave infrared subunit of the LEOU for a passenger car is given in FIG. 22. The field of view of the short-wave infrared channel of the LEOU is approximately 7° (H)×5° (V). For the long-wave infrared part of the LEOU an uncooled micro-bolometer with a pixel pitch of 17 micron can be assumed. For the LWIR four times the IFOV of the visible channel can be used. This allows for simple pixel processing of the dataset as the ratio is a factor four. The requirement for the effective focal length of the long-wave infrared channel of the LEOU yields EFL=44.74 mm. An optical layout of the long-wave infrared subunit of the LEOU for a passenger car is given in FIG. 23. The field of view of the long-wave infrared channel of the LEOU is approximately 14° (H)×11° (V). The SEOU of the situational awareness system for a passenger may use a light detection and ranging (Lidar) remote sensing unit for probing the surroundings of the passenger car.

The radar unit (RU) is preferentially mounted in the front of the vehicle in the case of a passenger car. A radar unit at the back of the passenger car is not mandatory for a good operation of the situational awareness system.

Figure 25:
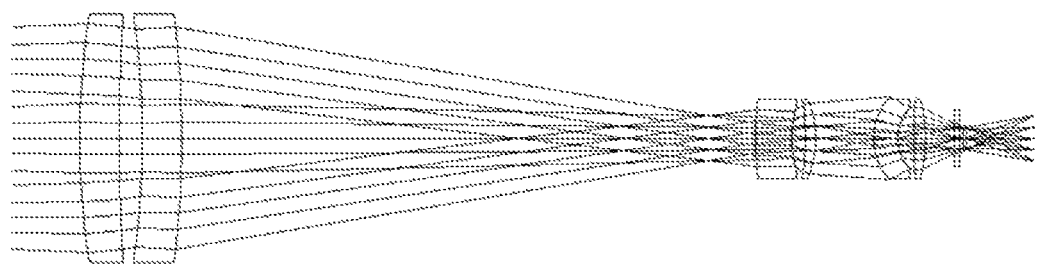
FIG. 25 illustrates the 2D optical layout of a medium wave infrared (MWIR) objective for inland naval applications.

When the vehicle is an inland naval vessel then the parameters characterizing the situational awareness system can be adapted accordingly. A medium wave infrared (MWIR) unit is necessary to observe the surroundings through fog conditions. By using the thermal infrared wavelength bands SWIR, MWIR, and LWIR in the acquisition of objects in the scenery of an inland navigation vessel, its situational awareness under fog conditions can be secured. The MWIR channel covers the wavelengths from 3 μm to 5 μm. The detector module is based on read-out integrated circuit (ROIC), a sensing layer of InAlSb, a miniature Dewar, a miniature low power consumption linear cooler and proximity electronics. The detector array consists of 640 (H)×512 (V) pixels having a pixel pitch of 10 μm and is sensitive from 3.6 μm to 4.15 μm. FIG. 25 shows a layout of the MWIR objective. This objective has a focal length EFL=100 mm and a f-number=3.6 while its total diagonal field of view is equal to 4.58°. The instantaneous field of view (IFOV) of the MWIR objective is IFOV=0.1 mrad. The field of view of the medium-wave infrared channel is approximately 3.7° (H)×2.9° (V).

Figure 26:
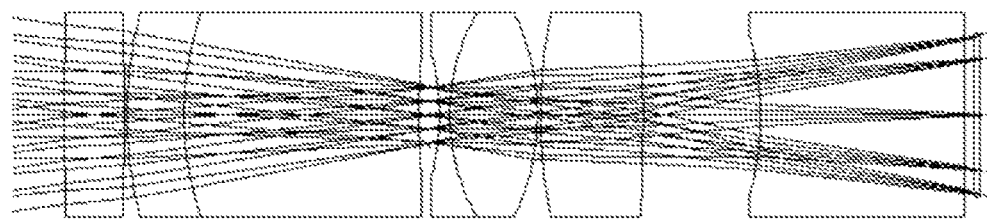
FIG. 26 illustrates the 2D optical layout of a visible (VIS) objective for unmanned aerial vehicles (UAV) applications.

When the vehicle is an unmanned aerial vehicle (UAV) then the parameters characterizing the situational awareness system can be adapted accordingly. The height at which commercial drones are authorized to fly is typically between 30 m and 60 m. The instantaneous field of view requirement is typically 0.1 mrad. When a CMOS sensor of 2048×2048 pixels with a pixel pitch of 5.5 μm is selected, it can be calculated that the effective focal length is EFL=55 mm. A f-number of 6.47 may be selected. FIG. 26 shows the layout of the VIS objective for a UAV. The objective is a-thermalized from −40° C. to +85° C. and is almost distortion free. The residual distortion is <0.005%.

Figure 27:
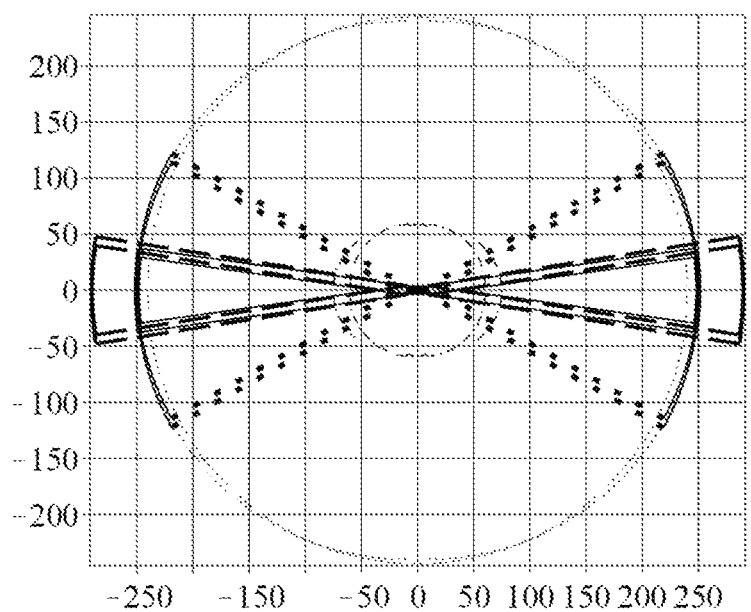
FIG. 27 illustrates field of view superpositions from a top view of a mining dump truck equipped with the complete SAS sensor packs as described in a preferred embodiment.
Figure 28:
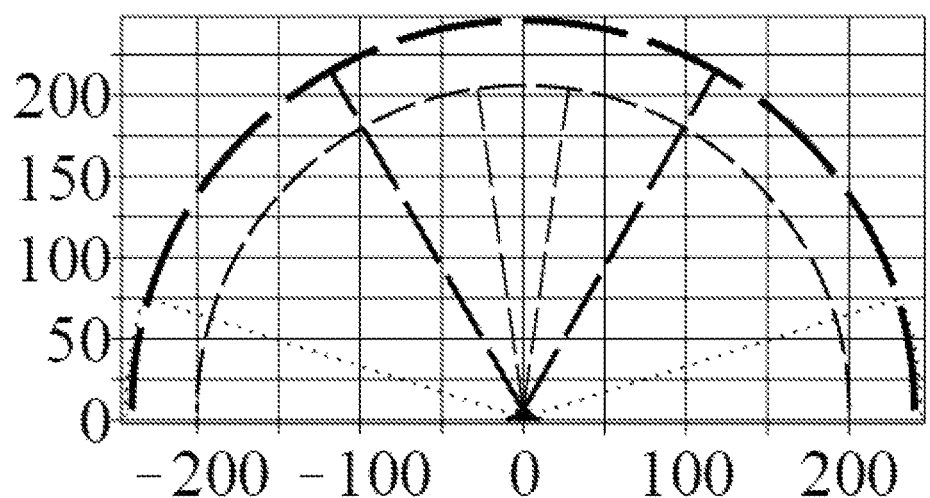
FIG. 28 illustrates field of view superpositions from a front view of a mining dump truck equipped with the complete SAS sensor packs as described in a preferred embodiment.

FIG. 27 illustrates field of view superpositions from a top view of a mining dump truck equipped with the complete SAS sensor packs as described in a preferred embodiment. The solid line corresponds to the field of view of the LEOU SWIR channel. The dash line represents the field of view of the LEOU LWIR and the dotted line shows the field of view of the LEOU VIS channel. The large circles in dotted line represent the field of view of the SEOU channel. The small circles in dash-dot lines represent the GEOU channel. FIG. 28 illustrates field of view superpositions from a front view of a mining dump truck equipped with the complete SAS sensor packs as described in a preferred embodiment. The dotted lines represent the field of view of the SEOU. The long-dash lines forming arcs show the field of view of the DBIU channel. The thin long-dash line represents the LWIR channel of the DBIU and the thick long-dash line the VIS channel of the DBIU. The solid lines close to the zero position in FIG. 28 show the field of view of the GEOU channel.

Figure 29:
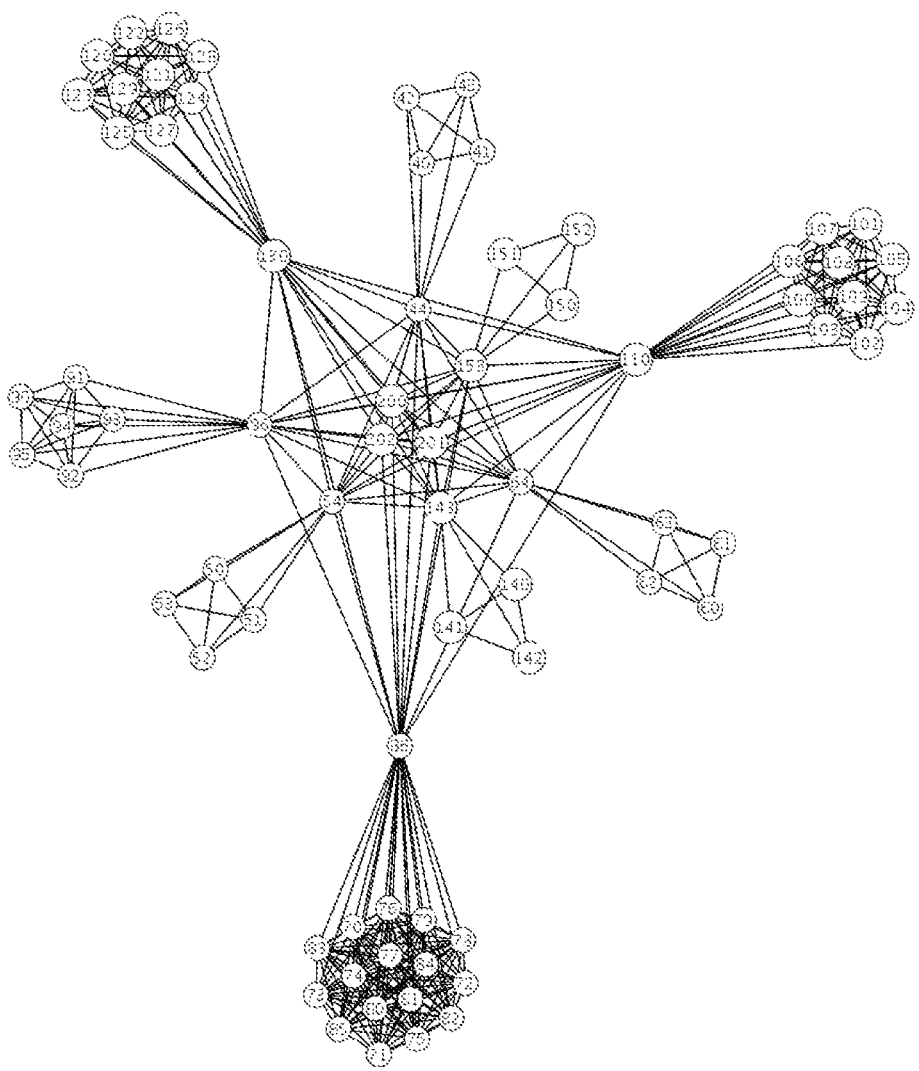
FIG. 29 illustrates the fault-tolerant distributed network architecture of the SAS of the autonomous dump truck.

The fault-tolerant distributed network architecture of the SAS of the autonomous dump truck is given in FIG. 29.

Figure 30:
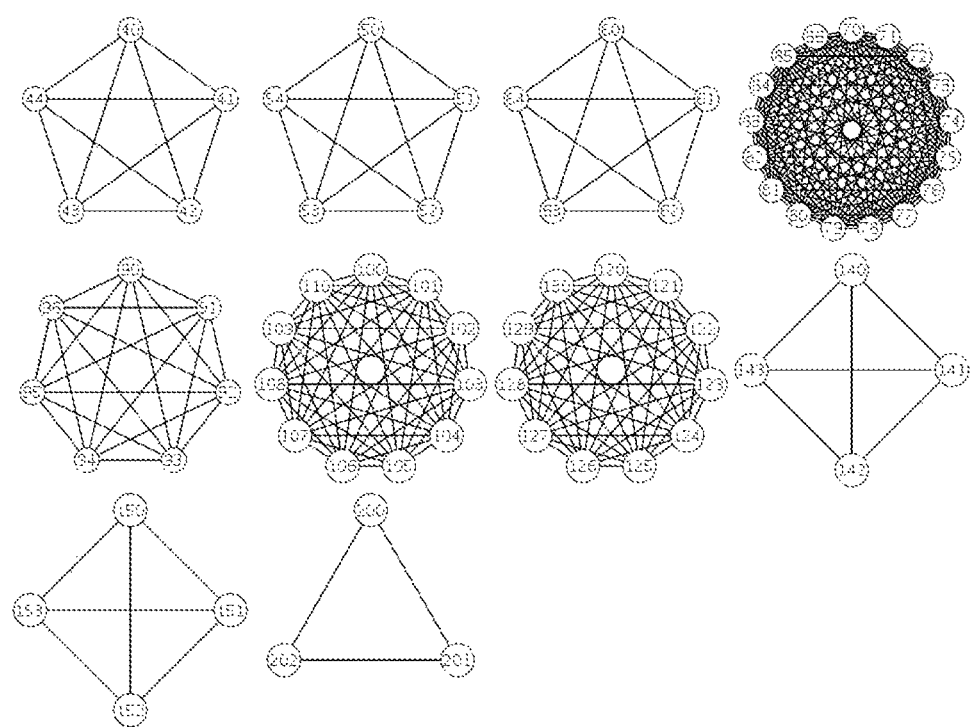
FIG. 30 illustrates the sub-graphs of the ten submodules of the situational awareness system (SAS).

FIG. 30 shows the sub-graphs of the ten submodules of the situational awareness system (SAS). The topology connecting the vertices {40,41,42,43,44} is representative for the VIS channel of the LEOU, the topology connecting the vertices {50,51,52,53,54} is representative for the SWIR channel of the LEOU, the topology connecting the vertices {60,61,62,63,64} is representative for the LWIR channel of the LEOU, the topology connecting the vertices {70,71,72,73,74,75,76,77,78,79,80,81,82,83,84,85,86} is representative for the short-range electro-optical unit (SEOU), the topology connecting the vertices {90,91,92,93,94,95,96} is representative for the ground-looking electro-optical unit (GEOU), the topology connecting the vertices {100,101,102,103,104,105,106,107,108,109,110} is representative for the VIS channel of the lower deck unit (LDU), the topology connecting the vertices {20,121,122,123,124,125,126,127,128,129,130} is representative for the LWIR channel of the lower deck unit (LDU), the topology connecting the vertices {140,141,142,143} is representative for the VIS channel of the dump body inspection unit (DBIU), the topology connecting the vertices {150,151,152,153} is representative for the LWIR channel of the dump body inspection unit (DBIU), the topology connecting the vertices {200,201,202} is representative for the radar unit (RU). The connection of the subsystems of the situational awareness systems (SAS) is performed by the topology connecting the vertices {44,54,64,86,96,110,130,143,153,202} and forming the core of the data synchronization unit (DSU).

Figure 19:
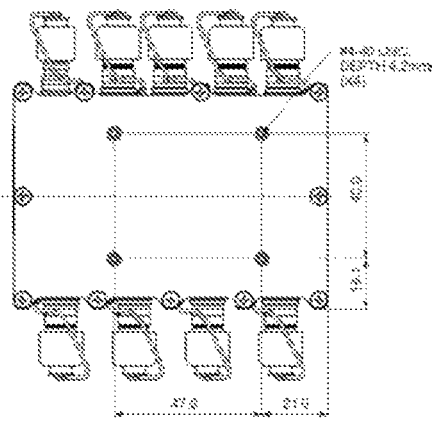
FIG. 19 illustrates a ruggedized Ethernet switch being one of the 8 switch modules used by the data synchronization unit (DSU).

The data synchronization unit (DSU) is that part of the situational awareness system (SAS) that guarantees the timely correct handling and creating of the dataset for the cyber-physical system. The reference clock of the data synchronization unit is derived from the master clock of the cyber-physical system (CPS). The data synchronization unit (DSU) is equipped with 8 ruggedized (MIL-STD-1275, MIL-STD-704A, MIL-STD461E, MIL-STD-810F GM, IP67/68) Ethernet switches, as shown in FIG. 19, having each 8×10/100/1000 data ports. The detailed minimum requirements for the data switch are given in Table 1.

TABLE 1

| Subunit | Channel | Data bit depth | #Hpixels | #Vpixels | Frames/s | Number Of Subunits | Data rate[bit/s] | Data rate[bit/s] per switch port |
|---|---|---|---|---|---|---|---|---|
| LEOU | LWIR | 14 | 640 | 480 | 25 | 4 | 430,080,000 | 107,520,000 |
| LEOU | SWIR | 12 | 640 | 512 | 25 | 4 | 393,216,000 | 98,304,000 |
| LEOU | VISNIR | 10 | 2048 | 2048 | 25 | 4 | 4,194,304,000 | 1,048,576,000 |
| SEOU | VISNIR | 12 | 2048 | 1088 | 25 | 16 | 10,695,475,200 | 668,467,200 |
| GEOU | VISNIR | 10 | 1920 | 1200 | 25 | 6 | 3,456,000,000 | 576,000,000 |
| LDU | LWIR | 14 | 640 | 480 | 25 | 10 | 1,075,200,000 | 107,520,000 |
| LDU | VISNIR | 10 | 1920 | 1200 | 25 | 10 | 5,760,000,000 | 576,000,000 |
| DBIU | LWIR | 14 | 640 | 480 | 25 | 1 | 107,520,000 | 107,520,000 |
| DBIU | VISNIR | 10 | 1920 | 1200 | 25 | 1 | 576,000,000 | 576,000,000 |
| RU | RADAR | — | — | — | 30 | 2 | 2,000,000,000 | 1,000,000,000 |
| | | | | | | 58 | 28,687,795,200 | |

The data synchronization unit is equipped with a set of system-on-a-chip (SoC) devices consisting each of two major blocks: a processing system (PS) and a programmable logic (PL) block where the field-programmable gate array (FPGA) is located. The computationally intensive operations are coded within the FPGA fabric. Real-time image processing operations are executed on the SoCs prior to the creation of the final data set to be transferred to the CPS.

Figure 18:
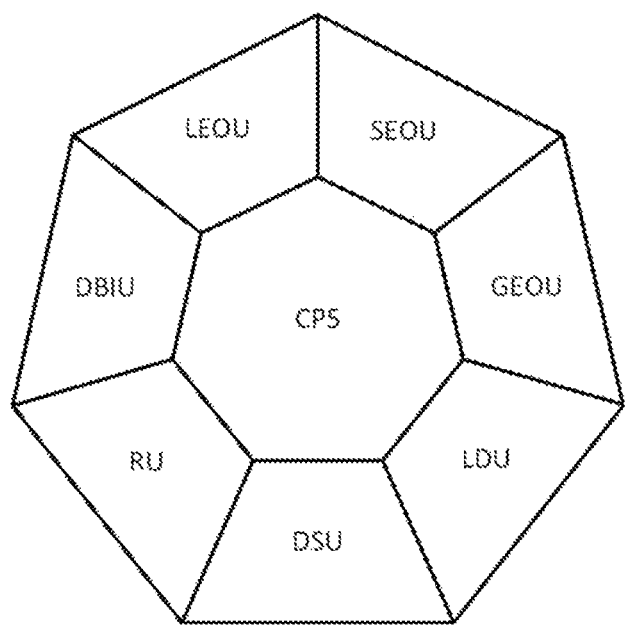
FIG. 18 illustrates the connectivity of the situational awareness (SAS), shown through its subunits (LEOU, SEOU, GEOU, DBIUY, LDU, RU and DSU), with the cyber-physical system (CPS)

The connectivity of the situational awareness system with the cyber-physical system (CPS) is given in FIG. 18. All the sub-units of the SAS, being the outer ring in FIG. 18 are connected to the central CPS.

The use of an all-weather situational awareness system (SAS), providing a data set to the cyber-physical system (CPS) increases the availability of the truck for the mining company and impacts the throughput of the mining company.

The invention claimed is:

1. A situational awareness system for a vehicle, wherein the situational awareness system is configured to generate an imaging dataset for processing by a cyber-physical system for enabling semi-autonomous or autonomous operational mode of the vehicle, wherein the situational awareness system includes a sensors system comprising:

at least four short-range electro-optical units with identical electro-optical characteristics configured for imaging surroundings of the vehicle to obtain spatial information of objects in the surroundings. wherein the at least four short-range electro-optical units have fixed focal length operating in a specific wavelength band;

at least four ground-looking electro-optical units with identical electro-optical characteristics configured for imaging a ground area in a direct vicinity of the vehicle, wherein the at least four ground-looking electro-optical units have fixed focal length operating in a specific wavelength band;

at least two imaging radar units including at least a first imaging radar unit pointing in a frontward direction of the vehicle and a second imaging radar unit pointing in a rearward direction of the vehicle, the first imaging radar unit and the second imaging radar unit being configured to image objects; and at least two long-range multi-spectral electro-optical units of fixed focal length including at least one first long-range multi-spectral electro-optical unit pointing in a forward direction of the vehicle configured for identification of spatial information of objects, and at least one second long-range multi-spectral electro-optical unit pointing in a rearward direction of the vehicle configured for identification of spatial information of objects, the at least two long-range multi-spectral electro-optical units including a first subunit configured for operating in at least one of a visible wavelength band or a visible-near-infrared wavelength band, a second subunit configured for operating in a thermal infrared wavelength band, and an optical splitter configured for separating wavelength bands to spectrally sensitive imaging sensors of the first and second subunits, and wherein the first subunit and the second subunit are arranged for co-axial spectral imaging of objects in a scene with, and wherein the first subunit and the second subunit have an equal instantaneous field of view and matching distortion, wherein a long-range multi-spectral electro-optical unit includes at least one optical stabilization arrangement, and wherein the long-range multi-spectral electro-optical unit further includes a laser range finder configured for optically ranging selected objects in the scene to provide the distance of the selected objects to the laser range finder; and wherein the situational awareness system further includes a data synchronization system configured to synchronize the multi-spectral imaging dataset obtained by each unit and subunit of the sensors system, wherein the data synchronization system is configured to provide the synchronized multi-spectral imaging dataset aligned in space and time to the cyber-physical system of the vehicle.

2. The situational awareness system according to claim 1, wherein the long-range multi-spectral electro-optical unit includes at least two long-range multi-spectral electro-optical units pointing in front directions, and configured such that captured scenes are at least partially overlapping, and includes at least two multi-spectral long-range electro-optical units pointing in rear directions, and configured such that captured scenes are at least partially overlapping, wherein the at least partially overlapping scenes allow the retrieval of 3D information of scenery in the scenes.

3. The situational awareness system according to claim 2, wherein the situational awareness system is configured to determine a depth perception using only the long-wave infrared subunit.

4. The situational awareness system according to claim 1, wherein the long-range multi-spectral electro-optical unit images at least four spectral bands covered by four different subunits.

5. The situational awareness system according to claim 1, wherein the second subunit is configured to operate in a wavelength range of 7 µm to 14 µm, or wherein the second subunit is configured to operate in a wavelength range of 3 µm to 5 µm.

6. The situational awareness system according to claim 1, wherein the second subunit is configured to employ an uncooled microbolometer.

7. The situational awareness system according to claim 1, wherein the thermal infrared subunit is using a cooled (T~70-85 K) imaging sensor.

8. The situational awareness system according to claim 1, wherein the laser range finder is an eye-safe laser range finder configured to operate in a wavelength range of 1.3 µm to 1.7 µm or a wavelength range of 0.78 µm to 0.98 µm.

9. The situational awareness system according to claim 1, wherein the situational awareness system comprises a network with a plurality of units distributed therein, wherein the plurality of units includes sensors, actuators and embedded systems, wherein the plurality of units are distributed in the network in a fault tolerant network topology.

10. The situational awareness system according to claim 9, wherein the fault tolerant network topology is represented mathematically by a graph consisting of vertices interconnected by edges and forming a wheel topology, and wherein the network includes a plurality of topology layers, wherein at least one topology layer of the plurality of topology layers of the network is arranged in a wheel topology arrangement.

11. The situational awareness system according to claim 10, wherein the edges are fiber-optic communication lines configured to convey at least three electromagnetic signals with different wavelengths.

12. The situational awareness system according to claim 11, wherein the vertices arranged around the central vertex are embedded computational systems each including a programmable logic part (PL), wherein the programmable logic part comprises at least three distinct logic fabrics each dedicated to concurrently process one of the at least three electromagnetic signals with different wavelengths.

13. The situational awareness system according to claim 10, wherein the network includes a central vertex arranged at the center of the wheel topology, wherein the central vertex is a central computing unit comprising at least three embedded computational systems communicatively coupled with respect to each other.

14. The situational awareness system according to claim 13, wherein each of the embedded systems of the central computing unit is configured to receive processing results from the other embedded systems of the central computing unit.

15. The situational awareness system according to claim 13, wherein the central vertex comprises a central validator, wherein each of the embedded systems of the central computing unit is configured to transmit its processing results to the validator, wherein the validator is configured to check whether the at least three embedded system of the central computing unit generate the same processing results.

16. The situational awareness system according to claim 10, wherein the central computing unit comprises at least a first, second, and third embedded computation system, wherein the first embedded computational system of the central computing unit is configured to receive and process first electromagnetic signals with a first wavelength from the plurality of embedded systems of the wheel topology which are arranged around the central computing unit, wherein the second embedded computational system of the central computing unit is configured to receive and process second electromagnetic signals with a second wavelength from the plurality of embedded systems of the wheel topology which are around the central computing unit, and wherein the third embedded computational system of the central computing unit is configured to receive and process third electromagnetic signals with a third wavelength from the plurality of embedded systems of the wheel topology which are around the central computing unit.

17. The situational awareness system according to claim 9, wherein redundant subsets of vertices are arranged in a redundancy arrangement in the distributed network, and wherein non-redundant subsets of vertices are arranged in a non-redundancy arrangement in the distributed network, and wherein the redundancy arrangement includes at least one of a triple modular redundancy arrangement, a four modular redundancy arrangement and a five modular redundancy arrangement.

18. The situational awareness system according to claim 17, wherein the network has a primary wheel topology arrangement and a secondary wheel topology arrangement, wherein the redundant subsets are connected in the primary wheel topology arrangement, and wherein the non-redundant subsets are connected in the secondary wheel topology arrangement.

19. The situational awareness system according to claim 18, wherein the redundant subsets are allocated to preselected critical units of the vehicle.

20. The situational awareness system according to claim 19, wherein the secondary wheel topology arrangement is arranged at physical or virtual axles of the vehicle.

21. The situational awareness system according to claim 17, wherein the network includes a plurality of multiplexers, such as a wavelength division multiplexer WDM, arranged at at least a subset of the embedded computational systems arranged in redundancy arrangement, wherein validators of the subset of the embedded computational systems are arranged at or integrated with the multiplexers.

22. The situational awareness system according to claim 17, wherein the vehicle is a moving wheeled vehicle, and wherein the redundant subsets are allocated to at least one of each wheel of the vehicle or each physical or virtual axle of the vehicle.

23. The situational awareness system according to claim 22, wherein the secondary wheel topology arrangement is arranged at the wheels of the moving wheeled vehicle.

24. The situational awareness system according to claim 9, wherein the vehicle includes at least two physical or virtual axles, wherein each of the at least two physical or virtual axles of the vehicle is provided with a distributed network comprising a subset of vertices configured in a redundancy arrangement, wherein each subset of vertices includes at least three vertices, wherein each vertex of a same subset of vertices is configured to produce an output indicative of a same event independently from other vertices of the same subset of vertices, and wherein each subset of vertices is communicatively coupled to a validator unit configured to monitor and compare the output of the vertices of the same subset of vertices in order to determine whether each of the outputs indicates occurrence of the same event, wherein the validator unit is configured to identify a failing vertex responsive to determining that the failing vertex does not indicate the occurrence of the same event as the outputs of the other vertices of the same subset of vertices that do indicate the occurrence of the same event, and wherein the cyber-physical system is configured to continue operation using the outputs of the other vertices of the same subset of vertices and without using the different output generated by the failing vertex of the same subset of vertices.

25. The situational awareness system according to claim 24, wherein each validator unit includes a voter-comparator integrated circuit coupled to the at least three vertices of the respective subset of vertices, the voter-comparator circuit configured to validate redundant data outputs of the at least three vertices in the respective subset of vertices, wherein the voter-comparator circuit is configured to determine an output result according to a majority of the plurality of redundant outputs of each of the at least three-vertices in the respective subset of vertices.

26. The situational awareness system according to claim 25, wherein the voter-comparator integrated circuit is configured to detect a computation error or faulty output according to the plurality of redundant outputs generated by the at least three vertices in the respective subset of vertices.

27. The situational awareness system according to claim 9, wherein the distributed network of the cyber-physical system includes a first subset of vertices in redundancy arrangement and a second subset of vertices in redundancy arrangement, wherein the vertices of the first subset of vertices and the vertices of the second subset of vertices are dedicated to a first physical or virtual axle of the vehicle and a second physical or virtual axle of the vehicle, respectively, and wherein the vertices of the first subset of vertices are positioned at or adjacent to the first physical or virtual axle, and wherein the vertices of the second subset of vertices are positioned at or adjacent to the second physical or virtual axle.

28. The situational awareness system according to claim 27, wherein the cyber-physical system includes a distributed network of at least one further subset of vertices in redundancy arrangement and dedicated to a further physical or virtual axle of the vehicle, wherein the vertices of the at least one further subset of vertices are positioned at or adjacent to the further physical or virtual axle of the vehicle.

29. The situational awareness system according to claim 9, wherein each physical or virtual axle of the vehicle is provided with a distributed network of at least one dedicated subset of vertices in redundancy arrangement.

30. The situational awareness system according to claim 9, wherein each redundant subset of vertices is arranged in a triple modular redundant configuration.

* * * * *